United States Patent
Roscher

(10) Patent No.: US 10,208,742 B2
(45) Date of Patent: Feb. 19, 2019

(54) ARRANGEMENT AND METHOD FOR DAMPING VIBRATIONS DURING MICROSCOPIC EXAMINATIONS

(71) Applicant: LIFE SCIENCE INKUBATOR SACHSEN GMBH & CO. KG, Dresden (DE)

(72) Inventor: Dietrich Roscher, Ilmenau (DE)

(73) Assignee: Life Science Inkubator Sachsen GmbH & Co. KG, Dresden (DE)

( * ) Notice: Subject to any disclaimer, the term of this patent is extended or adjusted under 35 U.S.C. 154(b) by 858 days.

(21) Appl. No.: 14/432,607

(22) PCT Filed: Oct. 1, 2013

(86) PCT No.: PCT/EP2013/070485
§ 371 (c)(1),
(2) Date: Mar. 31, 2015

(87) PCT Pub. No.: WO2014/053513
PCT Pub. Date: Apr. 10, 2014

(65) Prior Publication Data
US 2015/0252799 A1    Sep. 10, 2015

(30) Foreign Application Priority Data

Oct. 1, 2012   (DE) .................. 10 2012 019 688

(51) Int. Cl.
*F04B 39/00*   (2006.01)
*F25D 19/00*   (2006.01)
(Continued)

(52) U.S. Cl.
CPC ............ *F04B 39/0044* (2013.01); *B01D 8/00* (2013.01); *F04B 37/08* (2013.01);
(Continued)

(58) Field of Classification Search
CPC ...... F25B 9/00; F25B 9/10; F25B 9/14; F25B 9/145; H01J 19/12; H01J 35/28;
(Continued)

(56) References Cited

U.S. PATENT DOCUMENTS 2,838,137 A * 6/1958 Wallerstein, Jr. ....... F16F 7/104
                                                    188/380
4,161,747 A    7/1979 Frosh et al.
(Continued)

FOREIGN PATENT DOCUMENTS

AT    001975      2/1998
DE    3916032    12/1989
(Continued)

OTHER PUBLICATIONS

International Search Report dated Feb. 19, 2014 in International Application No. PCT/EP2013/070485. (4 pages).

*Primary Examiner* — Frantz Jules
*Assistant Examiner* — Erik Mendoza-Wilkenfe
(74) *Attorney, Agent, or Firm* — Olson & Cepuritis, Ltd.

(57) ABSTRACT

An arrangement for damping vibrations during microscopic examinations of inorganic and organic material specimens in an evacuated measuring at low temperatures that are cooled by an electromechanical cryocooler suppresses transfer of vibrations from the cryocooler onto the specimen, the microscope table and the instrument table. The arrangement includes a cryocooler unit and a microscopy unit combined with a damping unit preferably located on a common longitudinal axis. The damping unit has a series arrangement of inter-coupled evacuable compensation chambers arranged along the longitudinal axis, the series arrangement being combined with damper groups, two of which act at least diametrically. A clamping unit is operationally connected to the damping unit at at least two points on the series (Continued)

arrangement. A tension force of the damping unit is adjustable.

22 Claims, 10 Drawing Sheets

(51) Int. Cl.
      *F25B 9/00*       (2006.01)
      *H01J 1/18*       (2006.01)
      *H01J 19/12*       (2006.01)
      *F04B 3/00*       (2006.01)
      *F16M 7/00*       (2006.01)
      *F16F 9/02*       (2006.01)
      *G01J 1/02*       (2006.01)
      *G01J 3/00*       (2006.01)
      *G01M 7/00*       (2006.01)
      *B01D 8/00*       (2006.01)
      *F04B 37/08*       (2006.01)
      *F16F 15/04*       (2006.01)

(52) U.S. Cl.
      CPC .......... *F04B 39/0027* (2013.01); *F16F 15/04* (2013.01); *F25D 19/006* (2013.01); *F25B 2500/13* (2013.01)

(58) Field of Classification Search
      CPC ....... H01J 2229/0744; H01J 2229/0738; F04B 39/027; F04B 39/0033; F04B 39/0044; F04B 3/08; F04B 3/085; F04B 3/14; G02B 27/646; F16M 7/00; F16F 9/0245; F16F 9/0254; F16F 9/0263; F16F 15/022; F16F 1/121; F16F 1/12; F16F 1/13; G01J 1/0252; G01J 3/0286; G01J 5/061; G01M 7/00; G01M 7/02; G01M 7/022; G01M 7/027; G01M 7/04; G01M 7/045

See application file for complete search history.

(56) References Cited

U.S. PATENT DOCUMENTS

| | | | |
|---|---|---|---|
| 4,352,643 A | 10/1982 | Ijima | |
| 4,363,217 A | 12/1982 | Venuti | |
| 4,394,819 A * | 7/1983 | Averill | ................... F25D 19/006 |
| | | | 248/636 |
| 4,745,761 A | 5/1988 | Bazaj et al. | |
| 4,833,899 A * | 5/1989 | Tugal | ...................... F04B 37/08 |
| | | | 248/638 |
| 5,129,232 A | 7/1992 | Minas et al. | |
| 5,582,013 A | 12/1996 | Neufeld | |
| 6,131,394 A | 10/2000 | Lavietes et al. | |
| 2007/0121688 A1 * | 5/2007 | Ullman | ................... F41A 23/16 |
| | | | 372/34 |
| 2007/0234751 A1 * | 10/2007 | Nagamune | ............ F25D 19/006 |
| | | | 62/295 |
| 2010/0050661 A1 | 3/2010 | Snow et al. | |

FOREIGN PATENT DOCUMENTS

| | | |
|---|---|---|
| DE | 19510620 | 9/1996 |
| DE | 102004037837 | 5/2006 |
| DE | 102007022121 | 11/2008 |
| DE | 102011016552 | 10/2012 |
| EP | 0019426 | 11/1980 |
| EP | 160808 A | 3/1985 |

* cited by examiner

ARRANGEMENT AND METHOD FOR DAMPING VIBRATIONS DURING MICROSCOPIC EXAMINATIONS

CROSS-REFERENCE TO RELATED APPLICATIONS

This application is a § 371 U.S. National Stage of International Application No. PCT/EP2013/070485, filed Oct. 1, 2013, which designates the United States, and has been published as International Publication No. WO 2014/053513, and which claims priority to and the benefit of German Application Serial No. 10 2012 019 688.1, filed Oct. 1, 2012, both of which are hereby incorporated herein by reference in their entireties.

BACKGROUND OF THE INVENTION

The invention relates to an arrangement and a method for the damping of vibrations during microscopic examinations of inorganic and organic material specimens at low temperatures. It has been found that fluorescence effects can be amplified at low temperatures by avoiding so-called quenching effects so that the need to add contrast enhancing fluorescent dyes to the specimen can in part be obviated.

Avoiding partly toxic fluorescent dyes is advantageous in organic specimens, since the analysis results can be distorted by such dyes. It is also advantageous for such studies to be able to use commercially available laser microscopes, which are standard equipment in many laboratories and are not specifically designed for low-temperature examinations.

The use of these microscopes requires placing a special measuring cell with sufficiently low overall level, in which the actual specimen is located, between the microscope lens and microscope stage in the optical path of the microscope. The measuring cell should also be couplable with the coordinates of the microscope stage drive and easily removable.

Electro-mechanical cryocoolers have proven effective for cooling the specimens to temperatures below 100K, sometimes down to 4K, since their closed helium circuits avoid costly replenishment with helium. An unavoidable disadvantage of electro-mechanical cryocooler is vibrations that are introduced by the compression of the helium and pumps for producing a vacuum for thermal insulation. Vibrations of less than 10 nm are desirable for microscopic examination in order to avoid loss of optical resolution.

Electro-mechanical cryocoolers with reduced vibrations are known, for example pulse tube coolers. However, due to the operating principle, the moving piston of the compressor also introduces here vibrations. An attenuation of 60 to 80 dB is required for the vibrations of the cold head of the cryocooler with respect to the oscillation amplitude of the specimen holder. To make matters worse, the housing of the cryocooler also generates vibrations that propagate through the fasteners to the instrument table and via the housing of the measuring cell to the microscope stand and the microscope stage. Since other sensitive instruments may be positioned on the instrument table, the introduction of vibrations to the instrument table is undesirable.

Three nested damping systems are therefore required that, on the one hand, relate to conducting the cold temperature to the specimen in a measuring cell through an insulated vacuum line and, on the other hand, to keeping vibrations away from the instrument table and the microscope.

Cryocoolers usually vibrate at a fundamental frequency of 1 . . . 5 Hz due to the movement of the compressor piston, wherein vibrations in the order of typically in the range of 50 Hz to 100 Hz occur at both end stops of the piston movement upon contact with the compressor housing, depending on the design of the end stop damper in the cryocooler. An optimum damping system should therefore be able to suppress both the movement frequency of the compressor piston and the vibration frequency resulting from the end stop as well as vibrations of the gas column.

In connection with the use of a mechanical cryocooler, for example, for electron microscopy, different arrangements are known for reducing the effect from vibrations, which affect both the cold conductor and the housing.

According to the prior art, the cold conductor located between the cold head of the cryocooler and the specimen can be decoupled, for example, by way of flexible copper strands (U.S. Pat. No. 4,161,747) or gas springs containing a cold-transmitting gas. These strands can be designed to be very compliant with correspondingly thin diameters of the individual wires, thus largely suppressing the transmission of vibrations.

It becomes much more difficult to reduce the coupling of the energetic housing vibrations of the cryocooler to the instrument table and the microscope. In the document U.S. Pat. No. 4,745,761, these vibrations relative to the base plate are damped by elastomer mats, which are compressed by screwing the housing to the base plate. The transmission of vibrations to a gamma ray detector is reduced by an elastic bellow disposed between the housing of the cryocooler and a mounting plate for the detector, wherein the mounting plate is also connected via elastic elastomer mats to the base plate. The cold head is decoupled by strands with respect to the transmission of vibrations.

However, the solution proposed in the document U.S. Pat. No. 4,745,761 for vibration damping of a gamma ray detector only be applied in a limited way to a measuring cell for microscopy according to the object of the present invention, since the mounting plate for the detector can perform natural oscillations due to the elastic connection to the base plate. In addition, the elastomer mats provided for damping are compressed by the ambient pressure and lose their elastic properties.

Another type of vibration isolation between the cryocooler and a receptacle is shown in U.S. Pat. No. 4,394,819. The receptacle is disposed in a measuring cell that is permanently connected to a base plate. The cold is transferred from a cold head of the receptacle by a flexible connection. The cryocooler is floatingly suspended between two springs designed as bellows. The bellows fulfill a dual function. On the one hand, the bellows function as a spring. On the other hand, the bellows enclose an evacuated chamber, which is used for thermal insulation of the cold conductor. The static forces, which are caused by the ambient pressure and compress the chambers, cancel each other in the selected arrangement. The vibration of the cryocooler is affected by damping elements which act between the base plate and the housing of the cryocooler. Although the damping elements reduce the vibration of the cryocooler housing, a portion of the kinetic energy causes opposing forces and vibrations of the base plate.

The mass of the cryocooler, together with the elastic properties of the bellows, forms a damped spring/mass system with a distinct natural frequency. The damping properties of a resilient suspension of a vibrating body can be improved by arranging a plurality of resilient regions with different elastic and damping characteristics in series, as described in the document AT 001 975. The damping elements are here arranged parallel to the springs and act in terms of their forces also directly on the base plate.

Active vibration damping systems are also known. The document U.S. Pat. No. 5,582,013 proposes to apply to the cryocooler a force that is phase shifted by 180° with respect to the vibrational forces of the cryocooler and has the same magnitude. These opposing forces are generated by a drive of a counterweight that can move relative to the cryocooler. The magnitude and the phase of the opposing forces are derived from a sensor signal. The interpretation of the sensor signal is difficult, since the spectral power density of the vibration of the cryocooler must be interpreted. This power density changes during the operation and depends among other things on the temperature of the cold head.

The problem of interpreting the sensor signal is solved in the document U.S. Pat. No. 6,131,394 in that a vibration sensor disposed on the measuring cell is part of a control loop, wherein the parameters of the transfer function are changed depending on the operating condition. The signal is then processed by a signal processor, which is necessary because the relationships between vibrations at the measuring cell or specimen have a complex relationship with the necessary driving force at the opposing mass. Although the proposed solution compensates the vibrations at the specimen, no solution can be deduced therefrom to reduce the vibrations by way of the attachment of the cryocooler.

Furthermore, it was proposed in the document DE 39 16 032 in the context of active noise cancellation to sequentially connect several control loops in a row for generating a counter-oscillation. However, this document also does not disclose any solution for the three nested damping systems that address conducting the cold to the specimen in a measuring cell and also ensure that vibrations are kept away from the instrument table and the microscope.

SUMMARY OF THE INVENTION

It is the object of the invention to propose an arrangement for microscopic examination of inorganic and organic material specimens cooled by an electro-mechanical cryocooler, where the transmission of vibrations of cryocooler to the specimen, to the microscope stage and to the instrument table is suppressed.

According to one aspect of the invention, the arrangement for the damping of vibrations in microscopic examinations of specimens in an evacuated measuring cell at low temperatures, which includes a cryocooler unit and a microscopy unit, which are combined with a damping unit on a common longitudinal axis, wherein the damping unit has an arrangement of evacuable compensation chambers coupled together sequentially along the longitudinal axis, which is combined with dampers groups of which at least two operate diametrically, is characterized in that a clamping unit is operatively connected to the damping unit at at least two locations and that the method for damping vibrations in microscopic examinations of specimens in an evacuated measuring cell at low temperatures with an arrangement that includes a cryocooler unit and a microscopy unit, which are combined with a damping unit on a common longitudinal axis, is characterized in that a variable pretension is applied to the damping unit.

In this case, the cryocooler housing and the measuring cell are each separately resiliently suspended in a series arrangement of spring elements and damping elements. The measuring cell is fixedly connected to the microscope stage at least for the duration of the measurement, so that its coordinate drive can be used for positioning the specimen in the beam path of the microscope.

Advantageous embodiments are recited in the dependent claims.

Accordingly, in one embodiment of the invention, the clamping unit is designed so that the clamping force acting on the coupling connector is adjustable.

Advantageously, the operating point of the damping element formed from the coordinate values $F_v$ and $x_v$ can then be located in an optimum range where the vibration energy of the cryocooler maximally dissipated, i.e. converted into heat.

In another embodiment, the arrangement is characterized in that the clamping unit has a biasing spring, so that the clamping force acting on the coupling connector becomes (largely) independent of the vibration amplitudes at the coupling connectors. In this way, the stability of the operating point is maintained.

In another advantageous embodiment, the clamping unit includes at least one biasing spring, pressure bolt and clamping screw.

Another advantageous embodiment of the invention is characterized in that the cryocooler is attached to a coupling connector which connects two compensation chambers with each other, wherein each of the two compensation chambers is connected via one respective additional coupling connector with diametrically arranged dampers, with the clamping unit acting on the two coupling locations. This advantageously produces a symmetrical configuration with respect to the vibrating cryocooler, in particular when the parameters of each of the two compensation chambers and of each of the two dampers are identical.

According to another embodiment of the invention, one coupling connector of the series arrangement of compensation chambers and damping elements is connected to the cryocooler housing, whereas another coupling connector is connected to a balancing mass. These additional damping means advantageously suppress higher-frequency oscillations.

In another embodiment, at least one coupling connector of the series arrangement composed of compensation chambers and damping elements is connected to at least one vibration damper having a vibration absorbing spring and a free-swinging absorber mass. The arrangement of this additional damping element suppresses the fundamental frequency vibration.

Another advantageous embodiment is characterized in that the walls of the compensation chambers are designed as bellow springs, wherein the bellow springs of pairs of the first and second compensation chamber and of pairs of the third and fourth compensation chamber have identical cross sections and spring constants.

According to another embodiment, several means for directing the cold from a cold head to the specimen are provided, wherein at least one of the means is elastically and/or plastically deformable and another means is connected to the measuring cell with thermal insulation.

A development of the invention is characterized in that the measuring cell is connected to a microscope stage at least for the duration of the observation of the specimen. This advantageously suppresses completely relative movement of the specimen to the optical path of the microscope Another embodiment is characterized in that the measuring cell includes a measuring cell window located in the beam path of a laser microscope.

Another embodiment is characterized in that a frame and the microscopy unit are arranged on a common instrument platform, wherein the frame is displaceable and/or pivotable relative to the microscopy unit.

Advantageously, forming the dampers or damper groups as elastomer dampers is particularly inexpensive.

According to an advantageous embodiment of the method according to the invention, dimensions and material of the dampers are determined so that the dynamic forces acting on the damper during operation of the cryocooler cause a deformation of between minimally 0 to 20% and maximally 80%-100% of their permissible strokes and that a deformation of 30 to 70% of the permissible stroke is adjusted by means of a clamping unit (400) when the cryocooler unit (100) is switched off.

In another embodiment of the method, dimensions and material of the dampers are determined so that the dynamic forces acting on the dampers during the operation of the cryocooler unit effect a deformation between minimally 0 to 20% and maximally 80%-100% of their permissible deformation effect and that a deformation of 30 to 70% of the permissible deformation is adjusted by means a clamping unit when the cryocooler unit is switched off.

The translational movement of the compressor piston inside a cryocooler and the impact of the compressor piston on the housing of the cylindrical compression chamber at the reversal points causes reaction forces at the suspension of the cryocooler in a frame and at the coupling locations of the cold conductor, which cause vibrations due to the inherent resilience of any type of design of the suspension or the coupling. The vibrations are transmitted from the suspension to the instrument table and to other devices, such as the foot and the stage of the microscope, although conventional instrument tables are typically designed to be very rigid and provide vibration damping.

The damping system according to the invention is based on the concept of reducing the forces acting on the instrument table and on the microscope stage by a corresponding configuration of the damping means, with the resulting vibration amplitudes of the cryocooler then being viewed as having secondary importance compared to the cited prior art.

The vibrations caused by the cryocooler are dependent on the power. The required cooling capacity of an electromechanical cryocooler for cooling the specimen to a temperature below 100 K, for example, depends on the thermal loss along the path from the cold head of the cryocooler to the specimen. In addition, it should also be considered that the specimen is heated by the laser beam exciting fluorescence and that thermal radiation from the environment enters the measuring cell through the window.

Two-stage cryocoolers with a cooling capacity of for example 100 W in the first stage and 5 W in the second stage have proven to be suitable for attaining temperatures <10K. Coolers in this performance class with a rigid suspension cause impulse-like reaction forces on the order of, for example, 50 N to 100 N.

The frequencies of the forces acting on the suspension of the cryocooler in a frame or instrument table and the forces acting on the cold conductor are initially determined by the frequency of the piston movement. A movement cycle having a duration of, for example, 500 ms contains in this case two reversal points of the movement, wherein the velocity of the piston movement is reduced to zero at the reversal points. The resulting excitation frequency of the reversal points (hereinafter referred to as reversal frequency) is in this example 4 Hz.

The impact on the cylinder heads at the reversal points of the piston movement causes vibrations having a frequency and an energy that is higher by an order of magnitude.

Several solutions are known in the literature for reducing the effect of the impulse at the reversal points on the housing, when decelerating the piston movement, through a special design of the end stops or through a pneumatic reversal. Corresponding arrangements are disclosed, for example, in DE 195 10 620 or EP 160 808. However, vibrations with frequencies that are about one order of magnitude higher than those of the cyclic piston movement can still not be prevented.

Additional vibrations are caused by the vibration of the elastic gas column in conjunction with the mass of the piston.

Since the piston movement in the cryocooler occurs in the direction of the longitudinal axis, the damping system according to the invention can be limited to vibrations in the longitudinal axis. According to this limitation, the spring elements and damping elements also have two diametrically opposed structural interfaces oriented parallel to the longitudinal axis of the damping system. However, in accordance with the principles of the invention, a similar damping system may also be constructed for other axes in a coordinate system.

According to a main feature of the invention, a separate resilient suspension of the cryocooler housing and the measuring cell in a series arrangement of spring elements and damping elements is proposed. A series arrangement exists when one of the two structural interfaces of a spring element and damping element is connected via a coupling to one of the two structural interfaces of a second spring element or damping element. Conversely, a parallel arrangement exists when both structural interfaces of a spring element or damping element are connected to both structural interfaces of a second spring element or damping element. Parallel arrangements are described, for example, in the prior art (see U.S. Pat. No. 4,363,217 and U.S. Pat. No. 4,745,761).

In a particularly advantageous embodiment of the invention, the springs are designed as compensation chambers in order to provide at the same time a vacuum insulation of the cold conductor. A compensation chamber consists of a cylindrical bellow, which is closed off by two plates forming a structural interface and hence creating a closed chamber. The chamber is rigid in the radial direction and can only be slightly compressed by the ambient pressure. Conversely, the chamber has a high flexibility and a high resiliency in the axial direction.

When the chamber is evacuated, the ambient pressure causes a compression of the chamber in the axial direction. To avoid this, these chambers, as known from the prior art, are used in pairs with opposing effect. The static forces cancel when both chambers have the same cross-section.

Accordingly, four of these compensation chambers are required for a separate suspension of the cryocooler and measuring cell, with their effect being directed along the longitudinal axis of the damping system according to the invention. The shape of the compensation chamber is unimportant as long as they have high rigidity in the radial direction.

Such a chamber can for design reasons also be divided into several chambers with two common structural interfaces, provided that the total cross section corresponds to the cross-section of the partner chambers and the resulting spring characteristics are identical. The partial chambers arranged between two structural interfaces can for theoretical considerations be combined to a single replacement spring.

To explain the operation, the elastic connection of the cryocooler in a frame or chassis via a spring is first considered, as known from the prior art. With a spring constants $c_1$ in conjunction with the masses of the cryocooler $m_k$, and the structural elements firmly connected thereto, a spring/mass system with the natural frequency $\omega_k$ is obtained:

$$\omega_k = 2\pi f = \sqrt{\frac{c_1}{m_k}} \quad (1)$$

The resonance peaks at the frequency $\omega_k$ causes strong vibrations of the cryocooler which can be effectively suppressed by damping elements. If the damping element is arranged according to the prior art parallel to the suspension spring, i.e. the structural interfaces of the spring are connected to those of the damping element, the damping element operates on the frame with an additional force.

This situation creates a conflict when dimensioning the connection of the cryocooler in the form of a damped spring/mass system.

To minimize the forces acting on the suspension, the damping must on the one hand be kept small, as can be demonstrated theoretically. The spring/mass system then operates as a low-pass filter, although the effect of the low-pass filter relates to frequencies much higher than the natural frequency of the spring/mass system. On the other hand, the resonance peak can be reduced only by increasing the damping; however, higher forces from the damping element then also again act on the mounting frame.

To make matters worse, the excitation frequencies of the cryocooler are apart by one order of magnitude. In particular, the attenuation of the reversal frequency is difficult, since an effective spring mass system should have resonant frequencies that are substantially smaller than the reversal frequency of, for example, 4 Hz. Such spring/mass systems must therefore have large masses and correspondingly small spring constants.

The invention is based on the recognition that damping elements should be avoided in the design of a damping system which, as shown for example in the documents U.S. Pat. No. 4,363,217 and U.S. Pat. No. 4,745,761, directly generate a force interaction between the cryocooler and the mounting frame or the instrument table and thus bring about a deceleration of the cryocooler.

According to the invention, the necessary damping of the spring/mass system of the elastic connection of the cryocooler and the measuring cell to the mounting frame is attained by damping elements which are arranged in series with the connecting springs. With this arrangement, the magnitude and direction of the force acting on the damping element and suspension spring force are identical. The compliances of connection spring and the damping element are additive when taking into account phase relationships. The damping can then be optimally adjusted, without significantly increasing the forces acting on the frame.

Several possibilities exist for arranging a damping element connected in series with the spring.

In one embodiment of the invention, the damping elements are arranged in series with each resilient compensation chamber. The interfaces of the compensation chambers are in this embodiment connected by way of damping elements, for example in the form of elastomer dampers.

In the embodiment of the invention, it should be noted that substantial static tensile forces potentially in the order of 1000 N in occur the longitudinal direction due to the use of pairs of compensation chambers. The damping elements arranged in series are subjected to these forces. For example, when elastomer dampers are used, these static forces compress or overstretch the damper which severely limits the damping effect.

According to the invention, diametrically acting damper connect the series arrangement of spring elements with the frame, wherein forces are applied by a clamping unit onto coupling locations of the series arrangement, which reduce the effect of the static forces of the compensation chambers on the damping elements by a defined amount. An operating point of the damper can be adjusted by suitably dimensioning the clamping unit of the invention, which is particularly advantageous for elastomer dampers.

In one embodiment of the invention, the series arrangement in the direction of the longitudinal axis of the damping unit is composed of a damper coupled to the frame which is in turn connected to a series arrangements of a total of four compensation chambers which are in turn connected via another damper to a diametrically opposed clamping location of the frame. The coupling location of two compensation chambers is connected to the cryocooler housing, whereas the coupling location of the other two compensation chambers is connected to the measuring cell. The clamping unit according to the invention bridges the series arrangement of four compensation chambers and acts on the two diametrically opposed dampers.

In another embodiment of the invention, one end of the series arrangement of four compensation chambers is coupled via a damper to the frame. Another diametrically acting damper connects the coupling location of the second and third compensation chamber, which have no direct connection with the cryocooler or measuring cell, to the frame. In this case, although the clamping unit of the invention bridges only two compensation chambers, it also acts on the two diametrically opposed dampers. The damping system thus acts on both the cryocooler and the measuring cell.

When coupling the damper with the second and third compensation chamber, the forces are distributed commensurate with the mechanical impedances of the damper and the spring effect of the compensation chambers with which the measuring cell is coupled. With sufficiently high compliance of both compensation chambers, the portion of the forces acting on a microscope stage must be designed to be only a fraction of the forces of the vibrating cryocooler acting on the frame.

By combining the damping functions in a single damper, this damper can be designed more advantageously and more cost-effectively with a long service life and a defined characteristic curve than would be possible when using dampers in each resilient compensation chamber.

The effect of dampers is based on a velocity- and/or acceleration-dependent reaction force. In the technical implementation, all dampers also have an excursion-dependent reactive force. The clamping unit has the effect that an optimum operating point for the damper can be adjusted, wherein a maximum of kinetic energy is converted into heat with only minimal force applied to the frame.

The arrangement according to the invention can be combined with other damping measures.

In a further advantageous embodiment of the invention, a dynamic vibration absorber with a freely oscillating absorber mass is attached to the coupling location of the two compensation chambers that are connected to the cryocooler. The connection between the absorber mass and the cryocooler is designed to be soft enough so that the mass of the dynamic vibration absorber follows the movements of the cryocooler with a certain delay. The associated dissipated energy is extracted from the vibration and hence has a damping effect. The force does not act directly on the frame, but only via the serially arranged spring elements and damping elements of the series arrangement.

Another damping measure, which can be advantageously combined with the present invention, involves connecting the coupling location of the two compensation chambers that are connected neither to the cryocooler nor to the measuring cell with a balancing mass. This creates an additional low-pass system for suppressing in particular the high frequency vibrations of the cryocooler.

In accordance with the principles of the invention, the measuring cell is connected to elastic compensation chambers. It has been observed that the forces acting on the frame cannot be equal to zero despite a resilient suspension of the cryocooler and various damping measures and therefore introduce vibrations in the frame.

Since the measuring cell is firmly connected to the microscope stage at least for the duration of the measurement to prevent relative movement between the specimen and the optical path of the microscope, the forces introduced into the mechanically sensitive microscope stage by the resilient third and fourth compensation chamber are kept small.

According to an advantageous embodiment of the invention, the measuring cell is coupled with the positioning drive of the microscope stage. The flexibility of the compensation chambers associated with the measuring cell enables easy movement in several coordinates. It is particularly advantageous that a positioning unit for the specimen inside the measuring cell can be eliminated, which can otherwise be realized only with high costs due to the low temperatures and the restricted space.

Another propagation path for vibrations to the specimen exists via the cold conductor bar. Since the cold head of the cryocooler also vibrates relative to the housing of the cryocooler, the vibrations must be decoupled for example by way of a cold conductor flex coupling, which can be found in the prior art.

BRIEF DESCRIPTION OF THE DRAWING

The invention will be now described with reference to exemplary embodiments. The drawings show in.

DETAILED DESCRIPTION OF PREFERRED EMBODIMENTS

Figure 1:
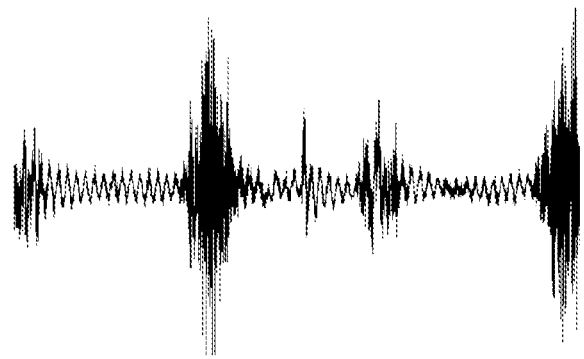
FIG. 1 a functional dependence of the excitation forces of the cryocooler.

FIG. 1 illustrates the functional dependence of the excitation forces of a commercially available cryocooler applied to a fixed clamping device as a function of time. Visible are the reversal points of the movement of the compressor piston with a time separation of approximately 250 ms, wherein amplitudes of a pronounced vibration with a frequency of about 80 Hz are observed especially at the reversal points. The vibrations of the gas column are visible between the maxima at the reversal points. Similar signal patterns are also found in the document US 2010/0050661.

Figure 2:
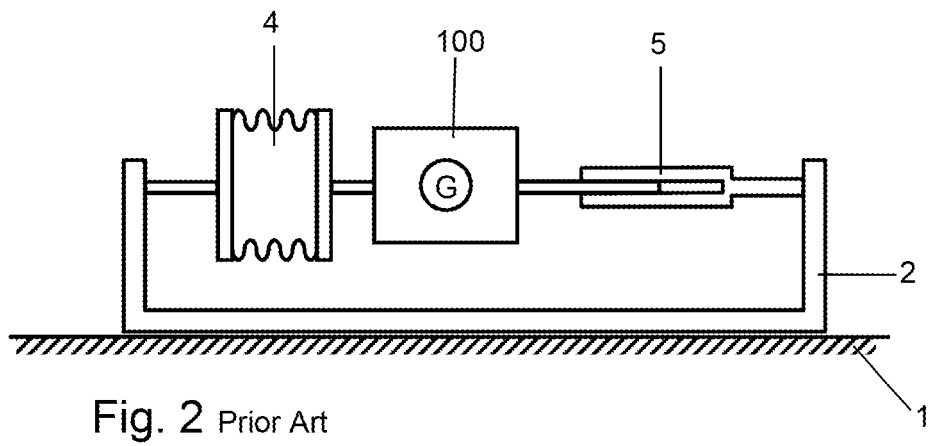
FIG. 2 a resilient suspension of a cryocooler according to the prior art.

FIG. 2 shows the schematic diagram of a resilient connection of a cryocooler 100 to a mounting frame 2, which can be found in various embodiments known from the prior art. A damping element 5 is arranged between the mounting frame 2 and the cryocooler 100 and reduces the vibration amplitude of the cryocooler 100.

The resilient connection of the cryocooler 100 in FIG. 2 consists of a bellow spring 4 which is attached on the one hand on the mounting frame 2, and on the other hand on the cryocooler 100. It is advantageous to evacuate the bellow spring 4 so as to simultaneously insulate the thermal connection between the cold head of the cryocooler 100 and a specimen. The elasticity of the bellow spring 4 is here advantageously produced by a bellow forming a cylindrical enclosure of a chamber. Bellows with defined spring stiffness are commercially available. The spring element and the damping element are arranged to produce a parallel effect, since the respective two structural interfaces are rigidly connected to each other.

If the bellow spring 4 is evacuated, a second bellow spring must be coupled to the cryocooler 100, as is known from the prior art, which cancels the ambient-pressure-induced static force of the first bellow spring 4. In relation to the schematic diagram in FIG. 2, this represents a parallel arrangement of two springs, which can be combined as a corresponding replacement spring.

As seen in the model of FIG. 2, the damping system for suppressing the housing vibration corresponds to a simple damped resonant circuit having a resonant frequency determined by the mass of the cryocooler 100 and the bellow spring 4. The resonant peak can be greatly suppressed by damping with the damping element 5.

The forces acting on the mounting frame 2 are composed of the force of the bellow spring 4 and of the damping element 5. It is evident that below the natural frequency, the ratio of the magnitudes of the resulting frame power to the excitation power of the cryocooler is about 1, i.e. strongly increases near the natural frequency depending on the damping and only decreases more or less above the natural resonance depending on the damping. The damping effect of the arrangement starts only at approximately twice the natural frequency of the resonant circuit formed by the mass of the cryocooler 100 and the bellow spring 4, wherein damping by the damping element 5 should be as small as possible, for example, $D_{AP}$=0.3. Furthermore, it then follows that the cryocooler which has a natural frequency much lower than 80 Hz should be connected to the mounting frame with a relatively low damping.

Elastic bellows with spring constants of <10 N/mm in combination with a mass of the cryocooler of, for example, 15 to 20 kg produce natural resonances of a few Hertz. The forces acting on, for example, the mounting frame can thereby be reduced in relation to the excitation force of the cryocooler by approximately 20 dB in relation to the dominant 80 Hz vibration component of FIG. 1, for example, by adjusting the damping factor to D=0.3.

The design of the damping system for suspending the cryocooler with a natural frequency that is well below the dominant excitation frequency, however, poses a conflict, because frequency components in the range of a few Hertz caused by the reversal frequency of the compressor piston can be found in the spectrum of the time-dependent signal of FIG. 1. These frequency components which are initially much weaker in the amplitude spectrum of the time-dependent signal than the spectral components of the dominant frequency of about 80 Hz, are more likely to be enhanced by a weakly damped suspension of the cryocooler.

Figure 3:
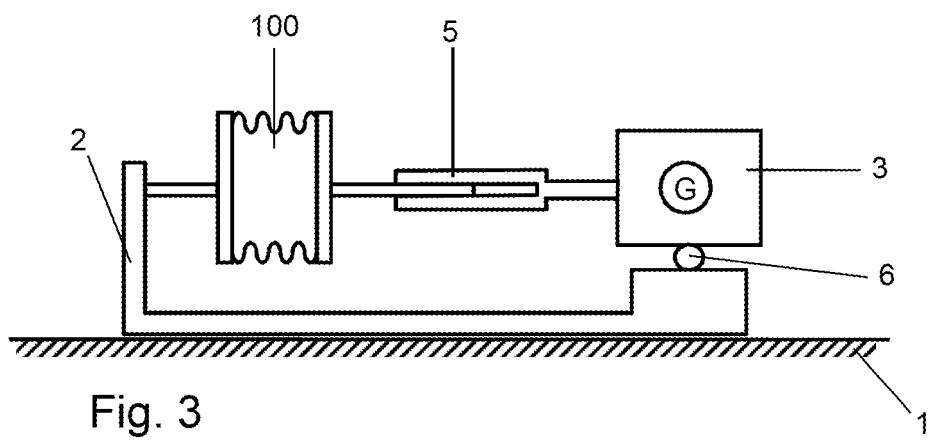
FIG. 3 a resilient suspension of a cryocooler with sequentially arranged damping elements.

Better results in terms of the damping properties are achieved when, as shown in FIG. 3, velocity-dependent damping elements are arranged in series with the elastic bellow spring 4. The opposing forces caused by the damping element 5 hereby do not act directly on the mounting frame 2, but instead act indirectly via the elastic bellow spring 4. It is hereby assumed that the time average of the vibration caused by the cryocooler 100 is zero, because otherwise the cryocooler 100 would drift with respect to the frame 2. The support of the cryocooler 100 against the gravitational force is illustrated schematically by a frictionless bearing 6.

In comparison with the diagram of FIG. 2, a much more favorable distribution of the forces on the mounting frame 2 is achieved in proportion to the excitation forces caused by the cryocooler, for example for a damping of D=0.7, which corresponds to an aperiodic limiting case. This insight forms a basis for the design of the damping system according to the invention.

As seen from FIG. 2, the resulting ambient-pressure-related forces would cause compression of the chamber when the chamber formed by the bellow spring 4 is evacuated in order to use the chamber also as insulation for the cold conductor. This makes it necessary to compensate for the ambient-pressure-related influence of static forces by way of a series arrangement of compensation chambers while simultaneously preventing excessive static forces on the damper.

Figure 4:
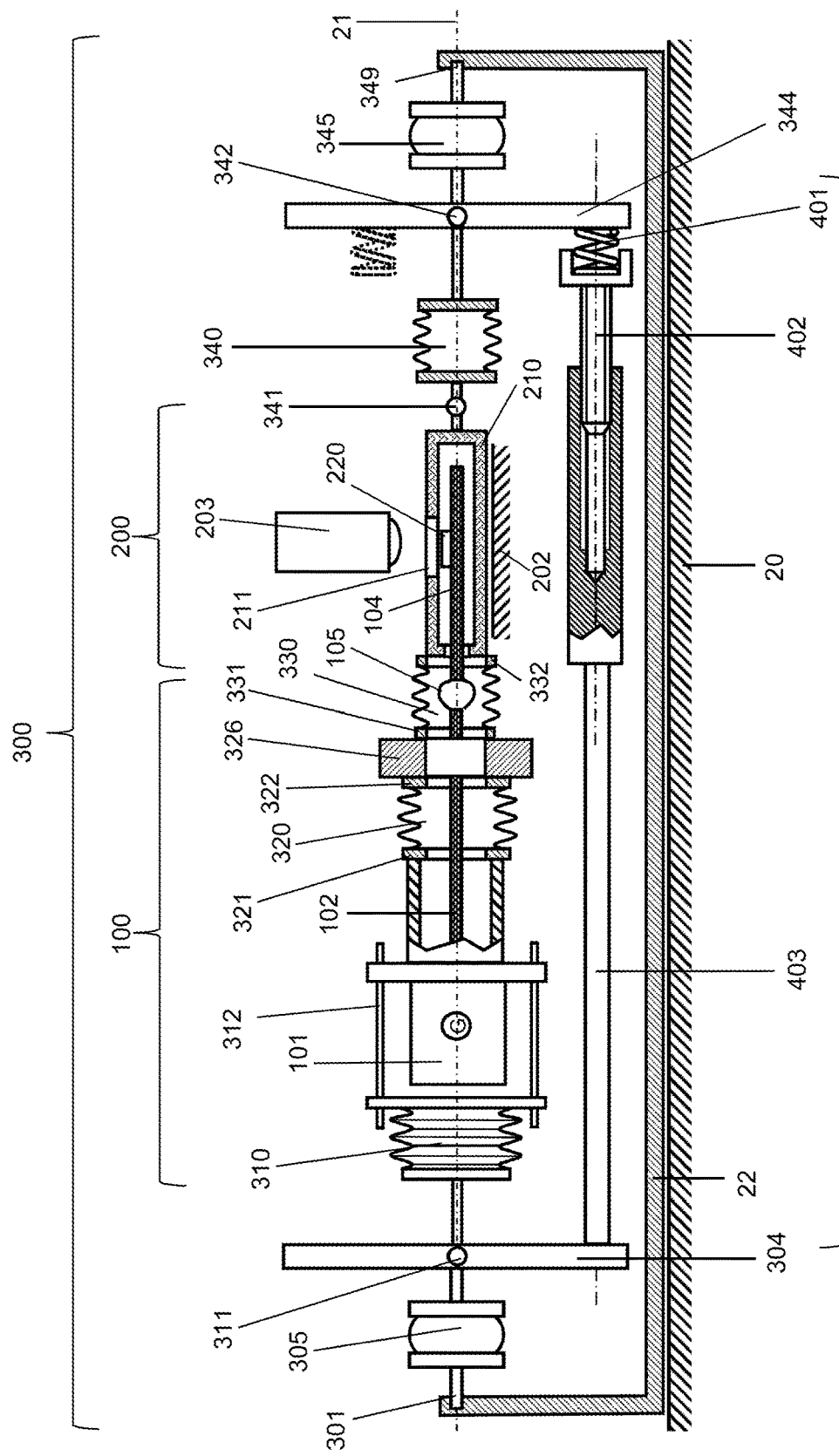
FIG. 4 a schematic longitudinal sectional view along the longitudinal axis of the damping system.

FIG. 4 shows the embodiment of a damping unit 300 according to the invention in form of a series arrangement of spring elements and damping elements, wherein the cryocooler housing 101 and the measuring cell 210 can move relative to each other, because they are arranged between two spring elements constructed as evacuable compensation chambers 320 and 330.

In FIG. 4, the cryocooler housing 101 is connected via the coupling location 312 to two spring elements 310 and 320 constructed as compensation chambers, whereas the measuring cell 210 is likewise connected via the coupling locations 332 and 341 with two spring elements constructed as compensation chambers 330 and 340. This creates a series arrangement of four compensation chambers 310, 320, 330, 340, which are each connected at their two outer coupling locations 311 and 342 with a respective damper 305 and 345. The damper 305 is connected to the frame 22 via its clamping point 301, while the damper 345 is connected to the frame 22 via its clamping point 349.

Both dampers 305, 345 act diametrically along a longitudinal axis 21 of the damping unit 300. This serial arrangement of the forces acting on a frame 22 minimizes the forces, resulting in strong vibrational decoupling of cryocooler housing 101 from the measuring cell 210. The frame 22 is located on an instrument table 20.

It is apparent from FIG. 4 that large forces are produced in the direction of the longitudinal axis 21 of the series arrangement when the compensation chambers 310, 320, 330 and 340 are evacuated, which applies on the dampers 305 and 345 tensile forces potentially on the order of 1000 N. Dampers suitable for this application would have to be able to absorb these tensile forces without degrading the damping properties. In practice, these dampers must therefore have in addition resilient properties to accommodate these tensile forces. This means that a spring must be arranged in parallel with the actual damper, which would in turn increase the dynamic forces acting on the frame.

Figure 5:
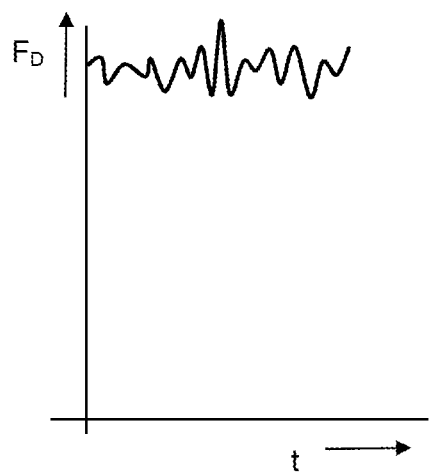
FIG. 5 a functional dependence the frame force without a clamping unit.
Figure 6:
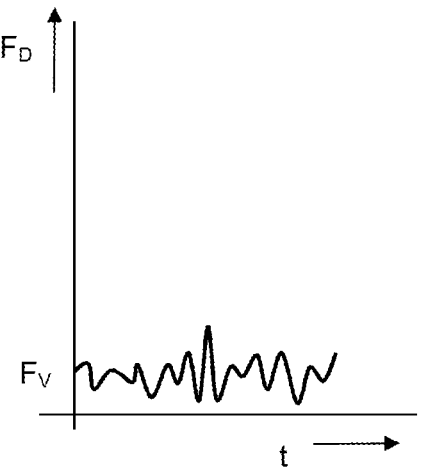
FIG. 6 a functional dependence of the frame strength with pretension.

FIG. 5 shows the functional dependence of the tensile forces in the series arrangement. The forces generated by the vibration of the cryocooler 100 in the order of 100 N are superimposed on the static forces of the evacuated compensation chambers 310, 320, 330, 340, which are in the order of 1000 N.

Therefore, diametrically opposed forces with respect to the longitudinal axis 21 are introduced by a clamping unit 400 according to the invention in a connecting plate 304 connected to the coupling locations 311 and in a connecting plate 344 connected to the coupling location 342. In this way, the static forces acting on the dampers 305 and 345 in the series arrangement can be reduced, reversed in the direction of the longitudinal axis 21 or even completely compensated.

In the exemplary embodiment of FIG. 4, this clamping unit 400 includes a biasing spring 401 in the form of a compression spring. The magnitude of tensile forces in the series arrangement can be influenced by rotating a clamping screw 402 against a pressure pin 403 and can be set to an optimum level for the dampers 305 and 345. The biasing spring 401 ensures that the biasing force remains approximate constant during the operation of the cryocooler unit 100. The arrangement of the clamping unit 400 hereby does not affect the spring effect of the connection of the cryocooler housing 101 and the measuring cell 210 in the series arrangement.

Figure 7:
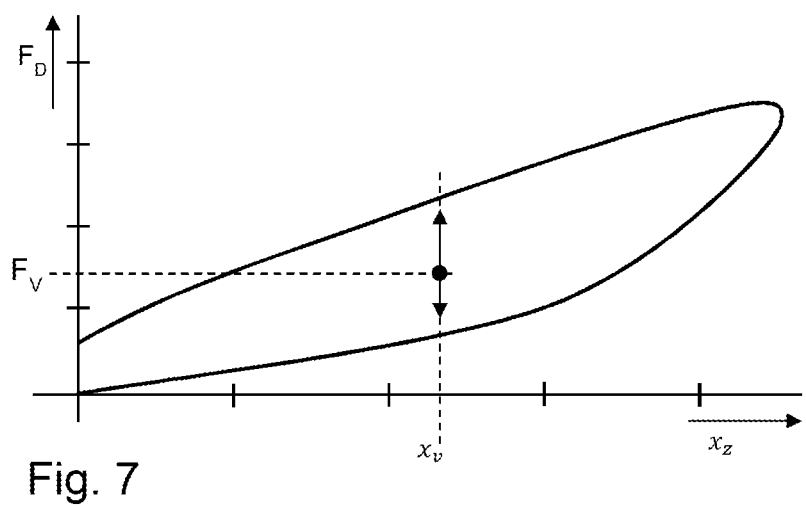
FIG. 7 a characteristic curve of an elastomer absorber.

FIG. 7 shows for example the characteristic curve of a damper made of an elastomer. Although a high proportion of the deformation energy is absorbed, a considerable part remains, which is stored and then given off as spring energy. The operating point of the shock absorber, where the vibration energy of the cryocooler unit 100 is maximally absorbed, i.e. converted into heat, can now be placed in an optimum range by selecting the spring constant of the biasing spring 401 and by turning the clamping screw 402 against the pressure pin 403.

It is very advantageous to slightly bias the dampers constructed, for example, as elastomer dampers 305 and 345 with a compressive force, since the effect of the damper is rather small in the relaxed state and in the fully compressed state.

Such condition arises when dimensions and material of the elastomer dampers are selected so that the dynamic forces $F_D$ acting on the elastomer damper during the operation of the cryocooler cause a deformation between a minimum of 0 to 20% and a maximum of 80%-100% of their permissible strokes $x_z$ and that a deformation $x_v$ from 30 to 70% of the permissible stroke is adjusted by the clamping device.

The diagram in FIG. 4 omits for sake of clarity a plurality of clamping units 400 arranged symmetrically about the longitudinal axis 21. It will be understood that a tilting moment must be avoided. The dampers 305 and 345 can each consist of a plurality of individual dampers which are arranged symmetrically about the longitudinal axis 21. Also not illustrated are guide members which allow movement of the cryocooler unit 100 and of the connection plates 304 and 344 only in the direction of the longitudinal axis 21.

The series arrangement shown in FIG. 4 was combined with a further damping action, which consists of a low-pass formed of a balancing mass 326 in conjunction with the compensation chambers 310, 320, 330, 340. The balancing mass is connected to the coupling locations 322 and 331.

The specimen 220 is located in the beam path of a confocal laser microscope and is excited to emit fluorescence by a laser though the microscope objective 203. At the same time, the specimen 220 can be visually observed through a window 211 in the measuring cell 210. The measuring cell 210 is fixedly connected to the microscope stage 202 by way of a clamping device during the observation of the specimen 220.

To cool the specimen 220, for example to temperatures around 10 K, the specimen 220 is mounted on a cold conductor bar 104 with tight thermal coupling. The specimen 220 and the cold conductor bar 104 must be thermally shielded from the environment, which is advantageously accomplished by evacuating the internal volume of the measuring cell 210.

Thermal coupling, which is also able to transmit vibrations, is provided between the specimen 220 inside the measuring cell 210 and the cold head 102 of the cryocooler. The flexible strand connection used in the prior art as a cold conductor flex coupling 105 can obviously be made soft enough so as to suppress the transmission of vibrations from the cold head 102 to the specimen 220. This cold conductor flex coupling 105 consists, for example, of a plurality of thin wires, for example OFD copper. The influence of the branch can therefore be neglected.

The cold conductor bar 104 is advantageous supported only pointwise in the cell measuring 210. The supporting material also advantageously includes a material having poor thermal conductivity, for example PEEK (polyether ether ketone) or Teflon.

The cold conductor bar 104, the cold head 102, the cold conductor flex coupling 105 and the measuring cell 210 form a closed evacuable space, because the coupling locations 321, 322 331 and 332 as well as the balancing mass 326 are open around the longitudinal axis 21, while including a vacuum-tight connection in the radial direction relative to the longitudinal axis 21.

Figure 8:
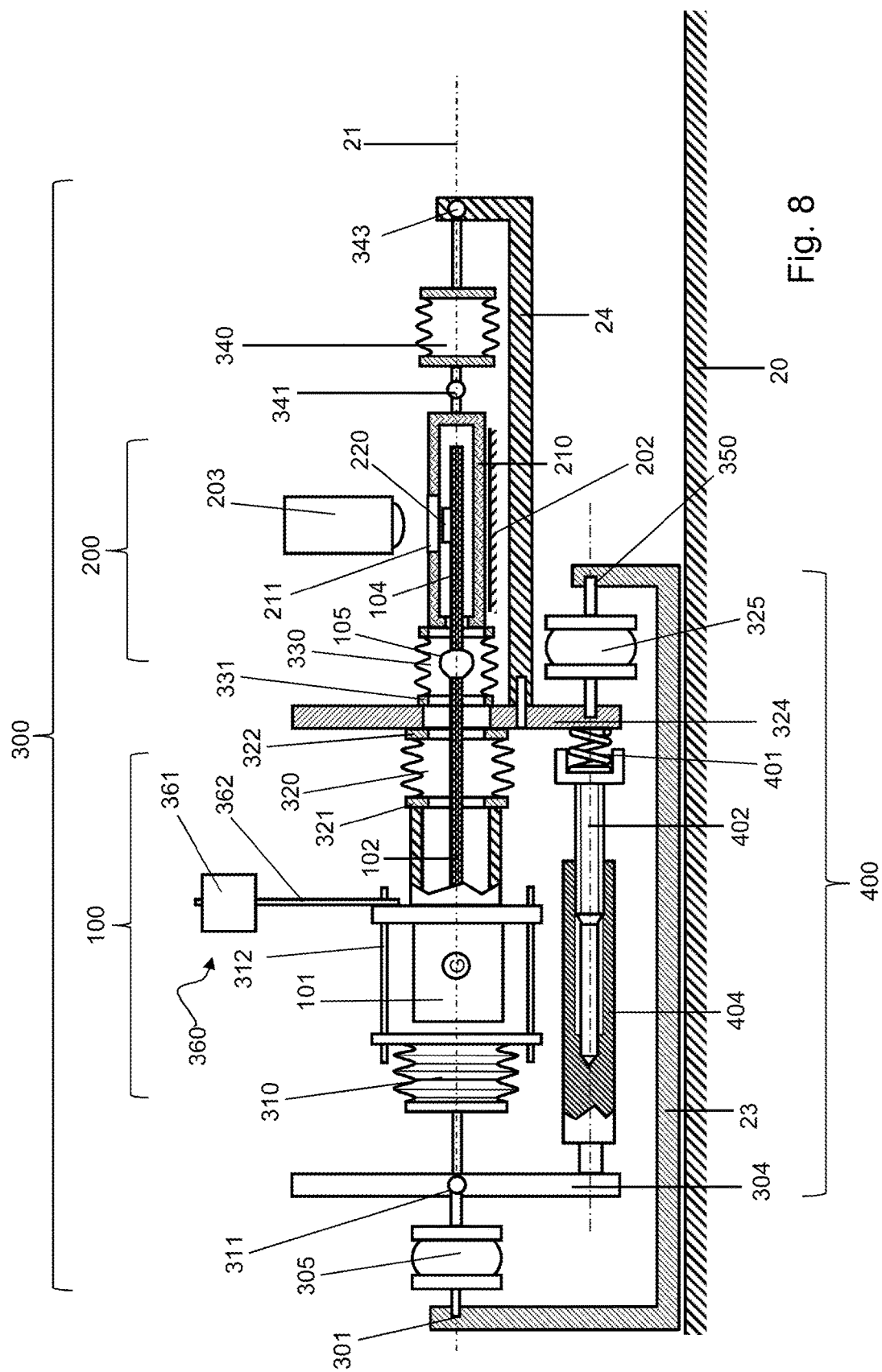
FIG. 8 a schematic longitudinal sectional view along the longitudinal axis of the damping system.

Another exemplary embodiment of the invention is shown in FIG. 8. One end of the series arrangement of four compensation chambers 310, 320, 330, 340 is coupled to the frame 23 via the damper 305. An additional diametrically-acting damper 325 connects the coupling locations 322 and 331 of the compensation chamber 320, 330 to the frame 23 via the connecting plate 324. In this case, although the clamping unit according to the invention 400 bridges only two compensation chambers 310 and 320, it also acts on the two diametrically opposite dampers 305 and 325. The dampers 305 and 325 act here both on the cryocooler housing 101 and on the measuring cell 210.

The coupling location 331 and the clamping point 343 are bridged by an auxiliary frame 24 which does not affect in any way the free movement of the measuring cell 210 with respect to the connecting plate 324.

According to FIG. 8, the connecting plate 324 is disposed between the coupling locations 322 and 331. The connecting plate 324 also includes an aperture around the longitudinal axis 21 for passing the cold head 102 through to an evacuable space.

The damping unit 300 according to FIG. 8 can also be combined with other damping measures. Based on the consideration that damping elements whose opposing forces act directly on the frame 23 should be avoided, in another advantageous embodiment of the invention, the cryocooler housing 101 is coupled with an additional dynamic vibration absorber 360 whose natural frequency is either close to the resonance frequency of the elastic suspension the cryocooler unit 100 or is close to the reversal frequency of the piston movement. Because the dynamic vibration absorber 360 shown in the example as a combination of a vibration absorber spring 362 and an absorber mass 361 is mounted on one side on the cryocooler housing 101, the forces act only via the clamping points 301 and 350, but not directly on the frame 23.

The vibration absorber spring 362 is designed so that the absorber mass 361 of the vibration absorber 360 follows the movements of cryocooler unit 100 with a certain delay. The associated energy is extracted from the vibration and hence dampening effect.

The positive effect of the dynamic vibration absorber 360 can be observed not only close to the natural frequency of the suspension of the cryocooler unit 100. Effects to minimize the forces acting on the frame 23 can be observed also in the range of the dominant excitation frequency of 80 Hz. The vibration forces acting on the frame 23 and the instrument table 20 are attenuated by, for example, approximately 40 dB with respect to the excitation, starting from about 10 times of the natural frequency of the suspension.

As an additional advantage of the series arrangement of the invention of four compensation chambers 310, 320, 330.340 in conjunction with the clamping unit 400, the measuring cell 210 is not connected directly to the frame 22 or 23, but rather via resilient compensation chambers 330 and 340. Residual vibrations of the frame 22 or 23 can thereby be effectively suppressed, since these frames 22 or 23 cannot be constructed with arbitrary rigidity and weight.

In other embodiments of the invention, the individual proposed damping measures are combined with each other.

According to another advantageous embodiment of the series arrangement of the invention of four compensation chambers 310, 320, 330.340 in conjunction with clamping unit 400, the measuring cell 210 is directly connected to the microscope stage 202 at least while a specimen 220 is observed. When the clamping connection between the measuring cell 210 and the microscope stage 202 is released, the entire damping device 300 can be retracted from or pivoted out of the beam path of the microscope objective 203. The measuring cell 210 is then freely accessible, for example, for changing the specimen 220.

Figure 9A:
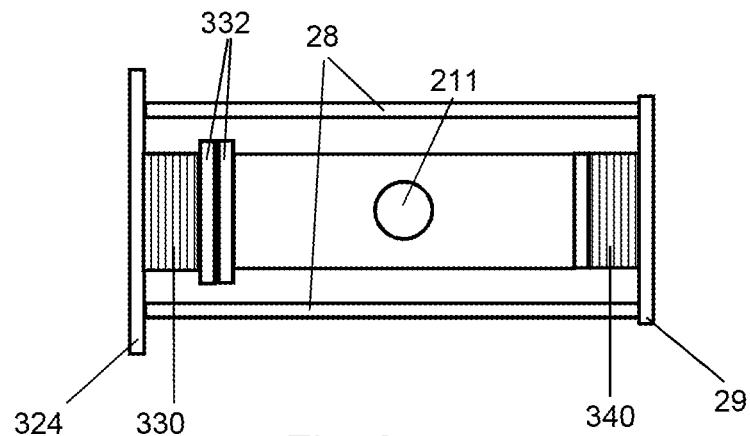
FIG. 9a a plan view of a measuring cell arrangement, a measuring cell.
Figure 9B:
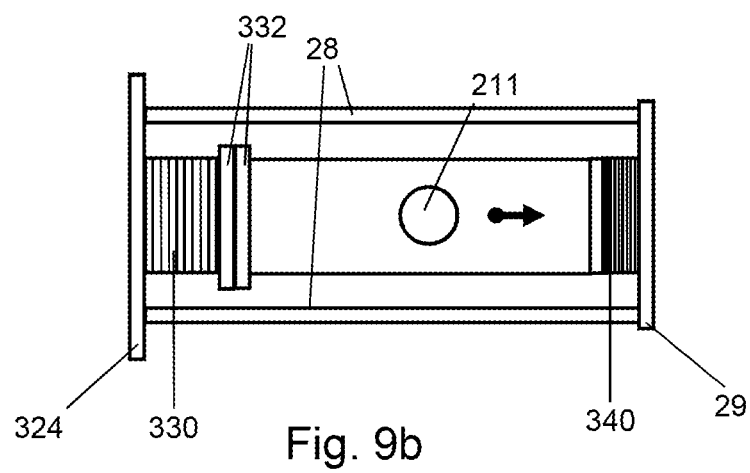
FIG. 9b a transverse displacement of the measuring cell in a first axis.
Figure 9C:
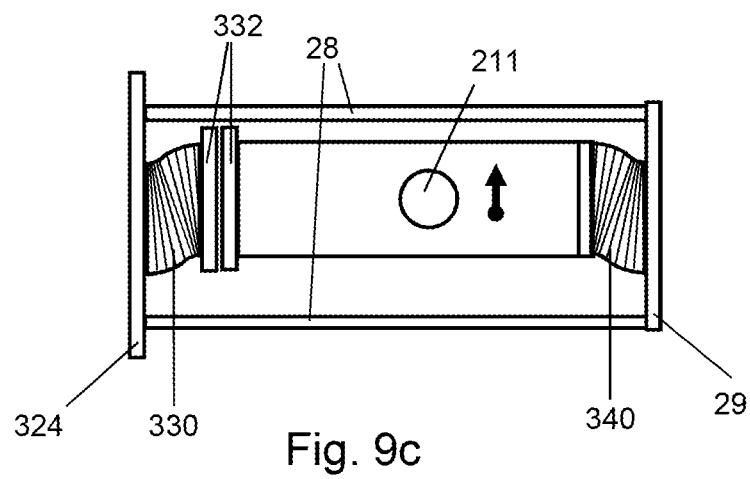
FIG. 9c a transverse displacement of the measuring cell in a second axis.

The measuring cell 210 is held on both sides by the compensation chambers 330 and 340 via a coupling location 332. The forces acting on the compensation chambers 330 and 340 forces compensate each other in the direction of the longitudinal axis 21 of the damping unit 300, since the respective other ends of the compensation chambers are connected to an end plate 29 and a connecting plate 324 (FIG. 9a to FIG. 9c). The end plate 29 is connected to the connecting plate 324 via supporting rods 28. The measuring cell 210 can thus be relatively easily moved in the direction of the longitudinal axis 21 despite the evacuation of the compensation chambers 330 and 340.

The force required to displace the measuring cell 210 in the direction of the longitudinal axis 21 of the damping system stems from the spring constants of the compensation chambers 330 and 340 and their parallel connection. These spring constants can be made sufficiently small by forming the bellows of the compensation chambers 330 and 340 from several individual layers.

For example, the compensation chambers 330 and 340 are constructed with a spring constant of 4 N/mm. When the measuring cell 210 is clamped on the microscope stage 202, relatively small static forces in the order of a few Newton act on the microscope stage 202, which can be easily overcome by the coordinate drive of the microscope stage 202, as illustrated in FIG. 9a is to 9c. A relative sideways movement or a movement in the direction of the optical axis of the microscope objective 203 accompanied by an S-shaped deformation of the compensation chambers 330 and 340 is also possible.

Conversely, dynamic forces are largely eliminated due to the resilience of the compensation chambers 330 and 340.

FIG. 1 shows the time dependence of the excitation forces of a commercially available cryocooler on a fixed clamping device. Visible are the reversal points of the movement of the compressor piston with a time separation of 250 ms, wherein amplitudes of a pronounced oscillation with a frequency of about 80 Hz can be observed especially at the reversal points. The vibrations of the gas column are discernable between the maxima at the reversal points. Similar signal patterns are also reported in the document US 2010/0050661.

FIG. 2 shows the diagram of a resilient attachment of a cryocooler unit 100 on a mounting frame 2 which is disposed on an instrument platform 20 and of which various embodiments are known in the prior art. A damping element 315 of a damping unit 300 is arranged between the mounting frame 2 and the cryocooler unit 100 and reduces the vibration amplitude of the cryocooler unit 100.

Figure 10:
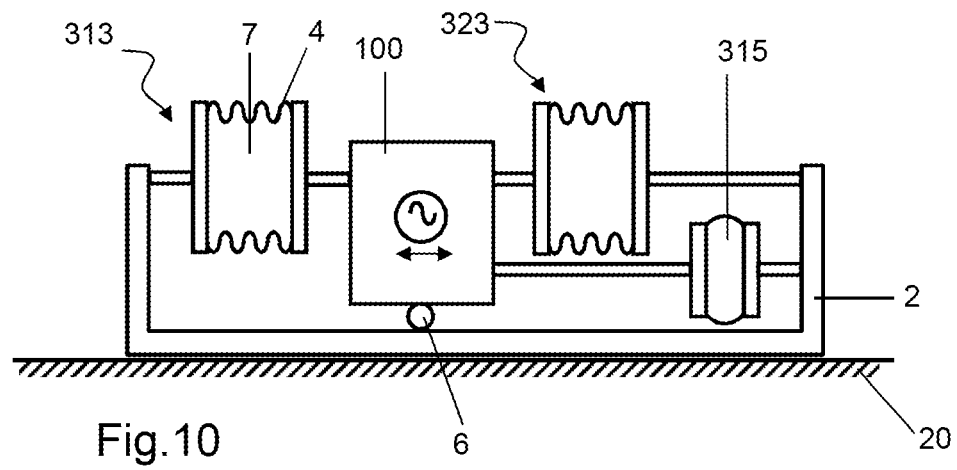
FIG. 10 coupling a cryocooler with a frame according to prior art.

The resilient coupling of the cryocooler unit 100 to the mounting frame 2 is carried out in FIG. 10 by two compensation chambers 313 and 323 which are fixed, on the one hand on the mounting frame 2 and, on the other hand, on the cryocooler 100. The compensation chambers 313 and 323 are composed of bellow springs 4 which enclose an evacuable chamber 7 and which simultaneously insulate a thermal connection (not shown in FIG. 10) between a cold head 102 of the cryocooler 100 and a specimen 220 (see FIGS. 11, 12, 13 and 14). The ambient pressure acting on the evacuated compensation chambers 313 and 323 generates forces which cancel each other with respect to the cryocooler 100 and prevent a collapse of the compensation chambers 313 and 323. In embodiments according to the prior art, to prevent a collapse, one of the two compensation chambers 313 and 323 can also be replaced by a spring, which is designed to compensate the ambient pressure. The support of the cryocooler 100 against the force of gravity is schematically illustrated by a frictionless bearing 6.

Figure 11:
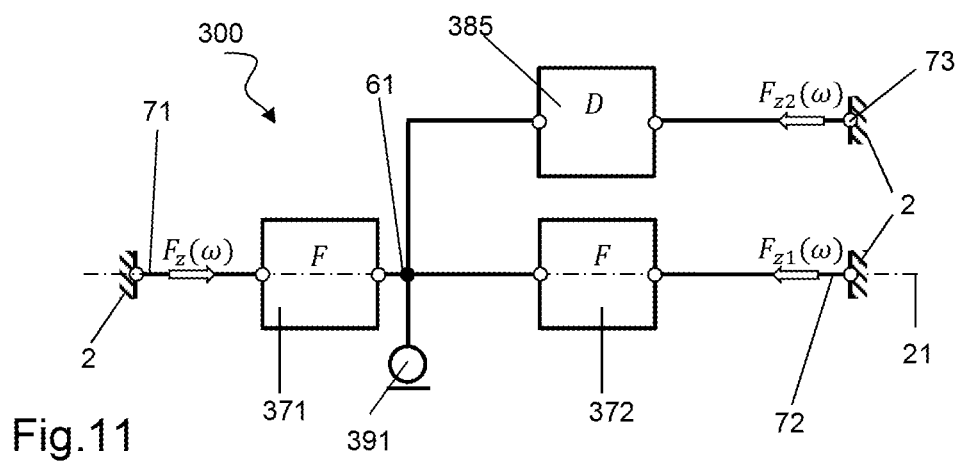
FIG. 11 a schematic diagram of a series/parallel arrangement in a damping unit according to prior art.

FIG. 11 illustrates a possible exemplary structure for the damping unit 300 in an abstract diagram of spring elements and damping elements 371, 372, 385 with a coupled mass 391. The spring elements 371 and 372, which correspond to the compensation chambers 313 and 325, are arranged in parallel with respect to the damping element 385 for their effect. The damping unit 300 is connected to the mounting frame 2 via the frame connectors 71, 72 and 73. The net mass of the cryocooler 100 and/or another weight can operate as the mass 391 in the damping unit 300.

The model according to FIG. 1 demonstrates that the damping unit 300 for suppressing the vibration of the housing is equivalent to a simple damped resonant circuit with a resonant frequency, wherein the resonant frequency is determined by the mass 391 and the spring constants of the spring elements 371 and 372. A resonant peak can be suppressed by the damping element 385.

The forces acting on the mounting frame 2 forces are composed of the force of the quasi-parallel spring elements 371 and 372 as well as the effect of the damping element 385. It can be shown that below the natural frequency the ratio of the magnitudes of the resulting frame force $F_z(\omega)$ to the excitation force of the cryocooler 100 is about 1, increases strongly near the natural frequency depending on the damping and decreases more or less only above the natural resonance depending on the damping. The causes a contradiction in the dimensioning of the damping unit 300. On the one hand, a resonant peak should be avoided while, on the other hand, vibrations of the frame force $F_z(\omega)$ should be effectively suppressed above the resonant frequency.

Commercially available elastic bellow springs 4 for the compensation chambers 313 and 323 with spring constants of <2 N/mm combined with a mass of cryocooler unit 100 of, for example, 15 to 20 kg produce natural resonances of a few Hertz. For example, the forces acting on the mounting frame 2 above the natural resonance can then be effectively reduced, for example, by adjusting the damping factor to D=0.3.

Figure 12:
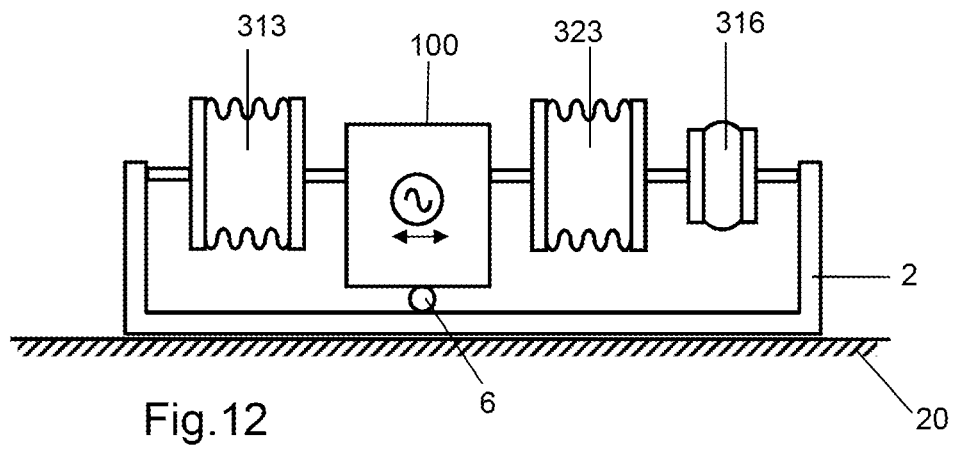
FIG. 12 coupling of a cryocooler housings with a frame via serially arranged spring elements and damping elements, FIG. 13 a schematic diagram of a series arrangement of a spring element and damping element in a damping unit according to prior art.

Better results in terms of the damping properties are achieved by arranging a damper 316 in series with the elastic compensation chambers 313 and 323, as shown in FIG. 12. As is evident from the schematic diagram of the spring elements 371, 372 and a damping element 382 in FIG. 5, opposing forces $F_z(\omega)$ caused by the damping element 382 do not act directly on the mounting frame 2, but only indirectly via the spring element 372. It is hereby assumed that the time average of the vibration caused by the cryocooler 100 is zero, since otherwise the cryocooler 100 would move relative to the mounting frame 2.

Compared to the diagram of FIG. 11, a much more favorable distribution of the forces $F_z(\omega)$ onto the mounting frame 2 in relation to the excitation forces caused by the cryocooler unit 100 is attained with, for example, a damping of D=0.7, which corresponds to an aperiodic limit. This insight forms a basis for the design of the damping system of the invention.

Figure 13:
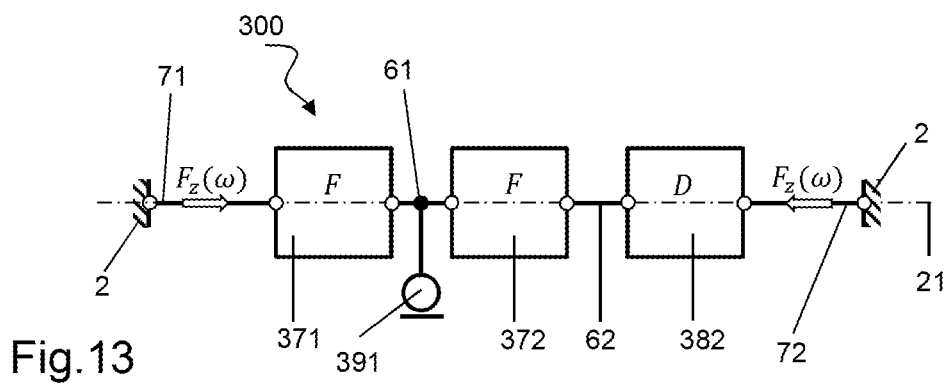

However, FIG. 13 also illustrates a disadvantage of the series arrangement of the spring element 372 and the damping element 382. Large static forces are generated along the longitudinal axis 21 when the spring element 371 and/or 372 is implemented as an evacuable compensation chamber 313 and/or 323. For a diameter of a compensation chamber of for example 100 mm and with the assumption that the diameter of the compensation chamber is not significantly reduced in the evacuated state, the longitudinal force $F_z(\omega)$ is approximately 780 N. This longitudinal force acts on all elements of the series arrangement 371, 372 and 382 as well as on the damping element 382 disposed in the series arrangement.

Figure 14:
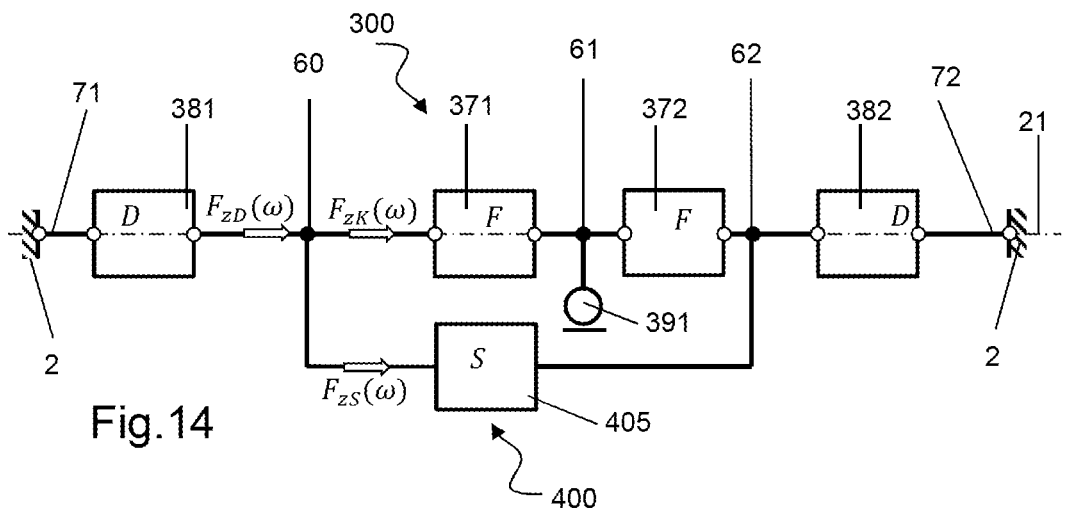
FIG. 14 a schematic diagram of a damping unit according to the invention with a series arrangement of spring/damper elements with clamping unit.

FIG. 14 illustrates the effect of the clamping unit 400 of the invention with the clamping element 405 on a series/parallel arrangement of spring elements 371, 372 and damping elements 381 and 382. The spring elements 371, 372 are connected via the coupling connector 61 with each other and simultaneously to the mass 391, which replicates the mass of the cryocooler 100. Both spring elements 471, 472 are coupled with the damping elements 381, 382 via the coupling connectors 60 and 62, respectively. The respective other coupling locations of the damping elements 381, 382 are attached on the mounting frame 2 via the frame connectors 71 and 72. The damping unit 300 is in the exemplary embodiment of FIG. 14 composed of a mass 391 and two series arrangements, each consisting of a damping element 381 or 382 and a spring element 471 and the 472.

The clamping force $F_{zS}$ or the reaction force of the clamping element 405 having the same magnitude but an opposing direction acts on the coupling connectors 60 and 62 of the damping unit 300 formed by the spring elements 371, 372, the damping elements 381, 382 and the mass 391. The following relationship applies with respect to the coupling connector 60:

$F_{zD}(\omega)=F_{zK}(\omega)+F_{zS}$, wherein $F_{zD}(\omega)$ is the force acting on the damping elements 381, 382, $F_{zK}(\omega)$ is the force acting on the spring elements 371 or 372, and $F_{zS}(\omega)$ is the clamping force of the clamping element 405.

The force $F_{zS}(\omega)$ applied via the damping elements 381, 382 can be adjusted by selecting the clamping force $F_{zS}$ so as to provide optimum conditions for the operation of the damping element, provided that the clamping element 405 is not directly connected to the mounting frame 2. This ensures that no additional frame forces with a vibration component are transferred to the mounting frame 2.

Figure 16:
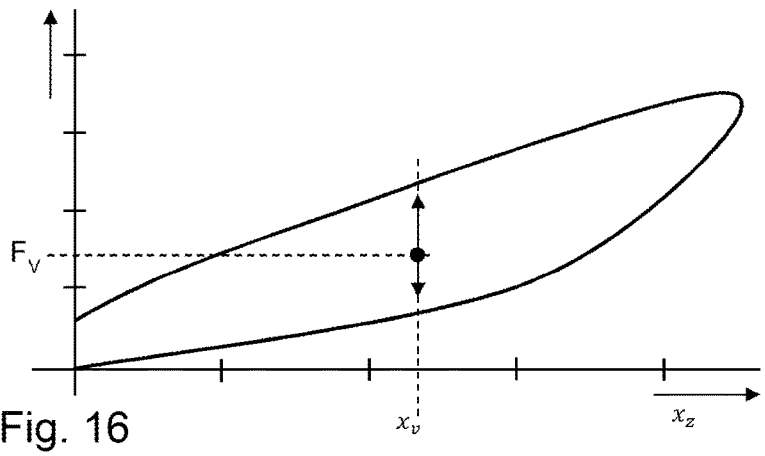
FIG. 16 a characteristic curve of a damper made of elastomer material.
Figure 17:
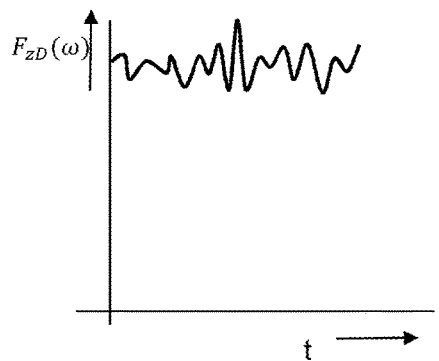
FIG. 17 a functional dependence of damping force $F_{zD}(\omega)$ acting on a damper without pretension.
Figure 18:
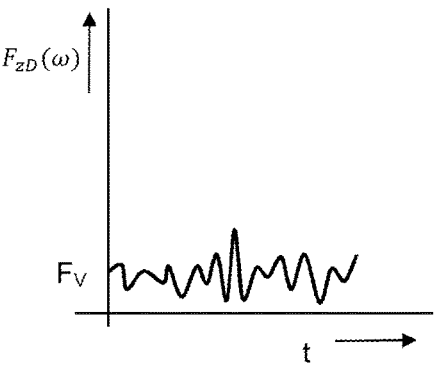
FIG. 18 a functional dependence of damping force $F_{zD}(\omega)$ acting on a damper with pretension.

These advantages are illustrated by the FIG. 16, FIG. 17 and FIG. 18. FIG. 16 illustrates, for example, the characteristic curve of a damping element 381, 382 made of an elastomer. Although a large fraction of the deformation energy is absorbed, a considerable part remains, which is stored and then given off as spring energy. The operating point of the damping element 381 and/or 382, formed of the coordinate values of $F_v$ and $x_v$, can now be placed in an optimum range by selecting the clamping force $F_{zS}$, in which the vibrational energy of the cryocooler 100 experiences maximum absorption, i.e. is converted into heat.

Advantageously, a small bias force $F_v$ is applied to the damping elements 381, 382 embodied, for example, as an elastomer damper, since the effect of the damping element 381, 382 is rather small both in the relaxed state and in the fully compressed state.

Such a condition arises when the dimensions and material of the exemplary dampers 305, 325, 345 (see FIGS. 19, 20) made of elastomer are selected so that the dynamic forces $F_{zD}(\omega)$ acting on the dampers 305, 325, 345 produce during the operation of the cryocooler unit 100 a deformation $x_v$ between a minimum of 0 to 20% and a maximum of 80%-100% of the permissible deformation $x_z$ and that a deformation $x_v$ from 30 to 70% of the permissible deformation $x_z$ is adjusted by the clamping unit 400 when the cryocooler unit 100 is switched off. FIG. 16 shows the functional dependence of the force $F_{zD}(\omega)$ applied via the damping elements 381 and 382 without a pretension force $F_v$, while FIG. 17 shows the functional dependence with a pretension force $F_v$.

Advantageously, the damping unit 300 is constructed symmetrical with respect to the coupling connector 61. In this case, both connections to the mounting frame 2 are equipped with spring elements 371, 372 and damping elements 381, 382 having respective identical parameters.

Advantageously, the clamping element 405 is constructed such that the clamping force $F_{zS}$ is applied, i.e. is independent of the position of coupling to the coupling connectors 60, 62 at least in the context of the vibration amplitudes occurring at the two coupling connectors 60, 62.

Figure 15:
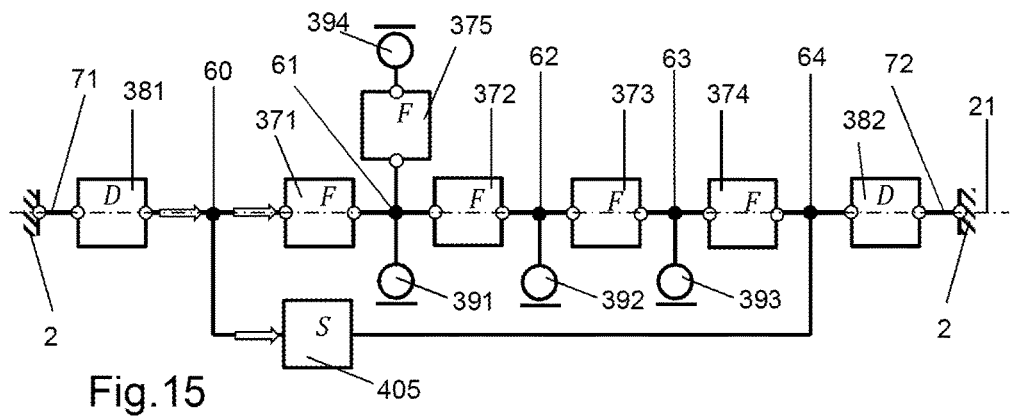
FIG. 15 a schematic diagram of a damping unit according to the invention with a series arrangement of four compensation chambers combined with a clamping unit.

FIG. 15 shows a more complex structure of the damper unit 300 with a coupled clamping element 405, wherein a total of four spring members 371, 372, 373, 374 are arranged in series. The series arrangement is terminated at both ends by damping elements 381, 382, which provide a connection to the mounting frame 2 via the frame connectors 71, 72. The clamping unit 400 according to the invention with the clamping element 405 thereby acts on the coupling connectors 60 and 64, but not directly on the mounting frame. 2

The coupling connector 61 is in turn connected to the mass 391, which is the net mass of the cryocooler 100. In addition, a dynamic vibration damper 360 in the form of another spring element 375 and a mass 394 is coupled to the coupling connector 61. Furthermore, the coupling connector 62 is connected to a balancing mass 392 to form a further low-pass filter for suppression higher-frequency oscillations. A mass 393 reproduces the dynamic properties of a measuring cell 210 in which a specimen 220 is located.

This series arrangement of four spring elements 371, 372, 373, 374 has the advantage that the vibrating mass 391, which represents the net mass of the cryocooler 100 with associated structural elements, is largely decoupled from the measuring cell 210, modeled by the mass 393 of the measuring cell 210.

Figure 19:
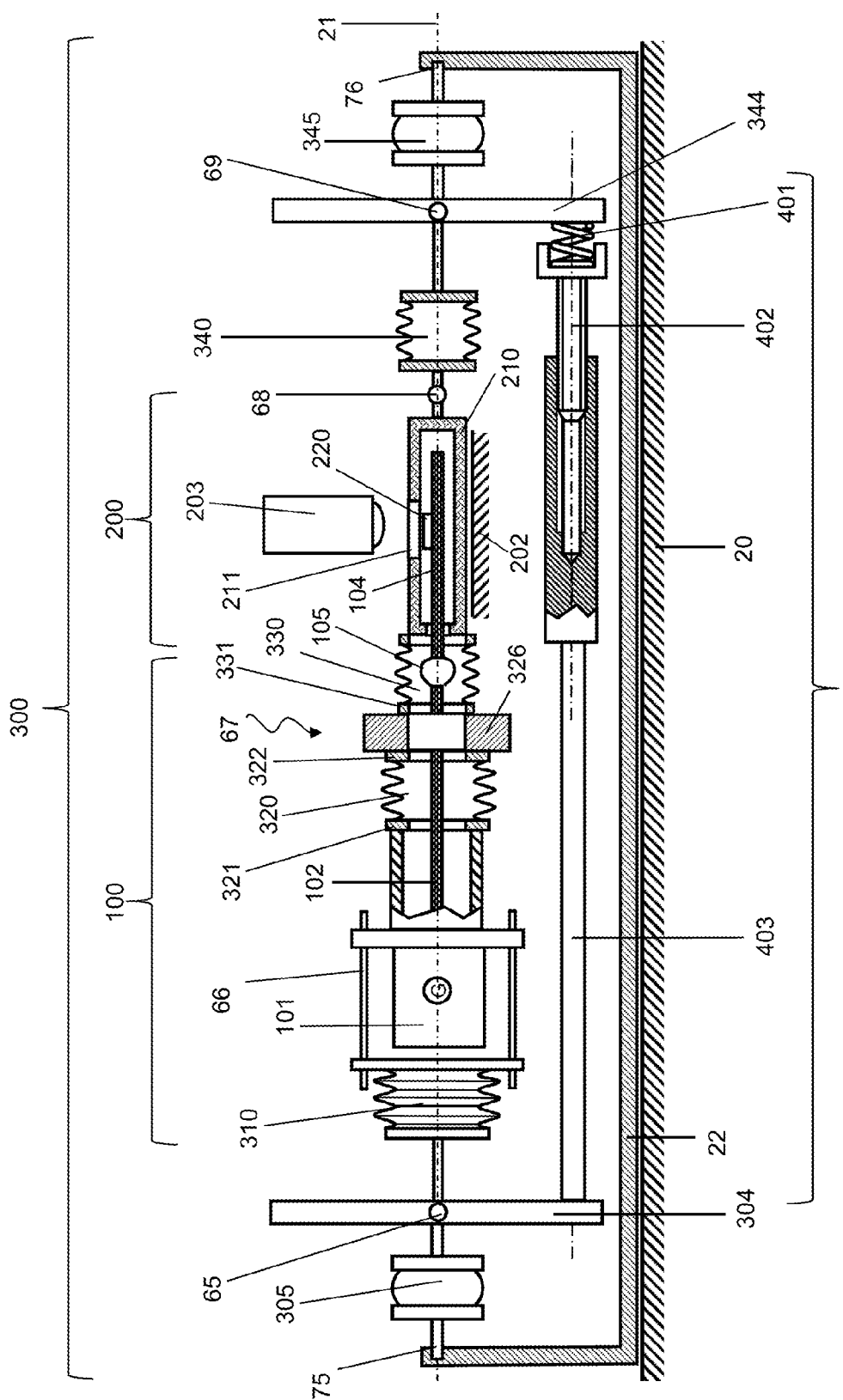
FIG. 19 a section along the longitudinal axis of a damping arrangement according to the invention for microscopy with a clamping unit bridging four compensation chambers.

FIG. 19 shows the embodiment according to the invention of the damping unit 300 as a series arrangement of resilient compensation chambers 310, 320, 330, 340 and dampers 305, 345 in combination with a clamping unit 400, which is derived from the schematic structure of the damping system 300 of FIG. 7.

In FIG. 19, the cryocooler housing 101 is connected to the two resilient compensation chambers 310 and 320 via the coupling connector 66. The measuring cell 210 is attached to the coupling connector 68 of the compensation chamber 330 and 340. This results in a series arrangement of four compensation chambers 310, 320, 330, 340, which is terminated at each of the two outer coupling connectors 311 and 342 with a respective damper 305 and 345. The damper 305 is attached to the frame 22 by way of the frame connector 75, whereas the damper 345 is attached to the frame 22 by way of the frame connector 76.

The two dampers 305 and 345 act diametrically along a longitudinal axis 21 of the damping unit 300. This serial arrangement minimizes the forces acting on a frame 22 and provides strong vibrational decoupling of the cryocooler housing 101 and measuring cell 210. The frame 22 is standing on the instrument platform 20.

It is evident from FIG. 19 that large forces are generated in the direction of the longitudinal axis 21 of the series arrangement when the compensation chambers 310, 320, 330 and 340 are evacuated, thereby applying to the dampers 305 and 345 forces potentially in the order of 1000 N. Dampers suitable for this application would have to be able to absorb these forces, without degrading the damping properties. In practice, these dampers will have to possess in addition elastic properties to accommodate these forces. They therefore correspond in reality in their effect to a parallel arrangement of a damping element and a spring element. The dynamic frame forces $F_z(\omega)$ are again increased.

FIG. 16 shows the functional dependence of the frame forces $F_z(\omega)$ in the series arrangement. The forces generated by the vibration of the cryocooler 100 in the order of 100 N are superimposed on the static forces of the evacuated compensation chambers 310, 320, 330, 340 in the order of 1000 N.

Therefore, diametrically acting forces with respect to the longitudinal axis 21 are introduced with the clamping unit 400 according to the invention into the connecting plate 304 attached to a coupling connector 65 and into the connecting plate 344 attached to the coupling connector 69. In this way, the static forces acting on the dampers 305 and 345 in the series arrangement can be reduced, reversed in the direction of the longitudinal axis 21, or even completely compensated.

In the embodiment of FIG. 19, this clamping unit 400 includes a biasing spring 401 in the form of a compression spring. The magnitude of the forces acting on the dampers 305 and 345 in the series arrangement can be influenced by turning a tensioning screw 402 with respect to a pressure pin 403, and can be set to an optimum level for the dampers 305 and 345. The biasing spring 401 ensures that the clamping force $F_{zS}$ is approximately constant independent of the vibrations at the coupling connectors 311 and 342. The arrangement of the clamping unit 400 does hereby not affect the spring effect of the connection of the cryocooler housing 101 and the measuring cell 210 in the series arrangement.

In the diagram of FIG. 19, a possible illustration of multiple clamping units 400 arranged radially symmetrically about the longitudinal axis 21 was omitted for sake of clarity. It will be understood that a tilting moment must be avoided. The dampers 305 and 345 can also consist of groups of individual dampers which are arranged symmetrically about the longitudinal axis 21. Also omitted is an illustration of guide members which would allow a movement of the cryocooler unit 100 and the connection plates 304 and 344 only in the direction of the longitudinal axis 21.

The series arrangement shown in FIG. 19 was combined with an additional damping measure, consisting of a low-pass filter to suppress higher-frequency vibrations and being formed from a balancing mass 326 in conjunction with the compensation chambers 310, 320, 330, 340. The balancing mass 326 is attached to the coupling connector 67 which connects the two coupling locations 322 and 331.

The specimen 220 is located in the beam path of a confocal laser microscope and is excited by a laser through the microscope objective 203 to fluoresce. At the same time, the specimen 220 can be visually observed through a measuring cell window 211 in the measuring cell 210. The measuring cell 210 is rigidly connected to the microscope stage 202 by an unillustrated clamping device during the observation of the specimen 220.

For cooling the specimen 220, for example to temperatures around 10 K, the specimen 220 is mounted on a cold conductor bar 104 with tight thermal coupling. The specimen 220 and the cold conductor bar 104 must be thermally shielded from the environment, which is advantageously achieved by evacuating the interior of the measuring cell 210.

Thermal coupling is provided between the specimen 220 inside the measuring cell 210 and the cold head 102 of the cryocooler, which is also capable of transmitting vibrations. The flexible strand connection used in the prior art as a cold conductor flex coupling 105 can be made soft enough so as to prevent transmission of vibrations from the cold head 102 to the specimen 220. This cold conductor flex coupling 105 consists, for example, of a plurality of thin wires, for example made of OFD copper.

Advantageously, the cold conductor bar 104 is only pointwise supported in the measuring cell 210. The supporting material also consists of a material having poor thermal conductivity, such as PEEK or Teflon.

The cold conductor bar 104, the cold head 102, and the cold conductor flex coupling 105 are located in a common evacuated space formed by the compensation chambers 320, 330 and the measuring cell 220.

Figure 20:
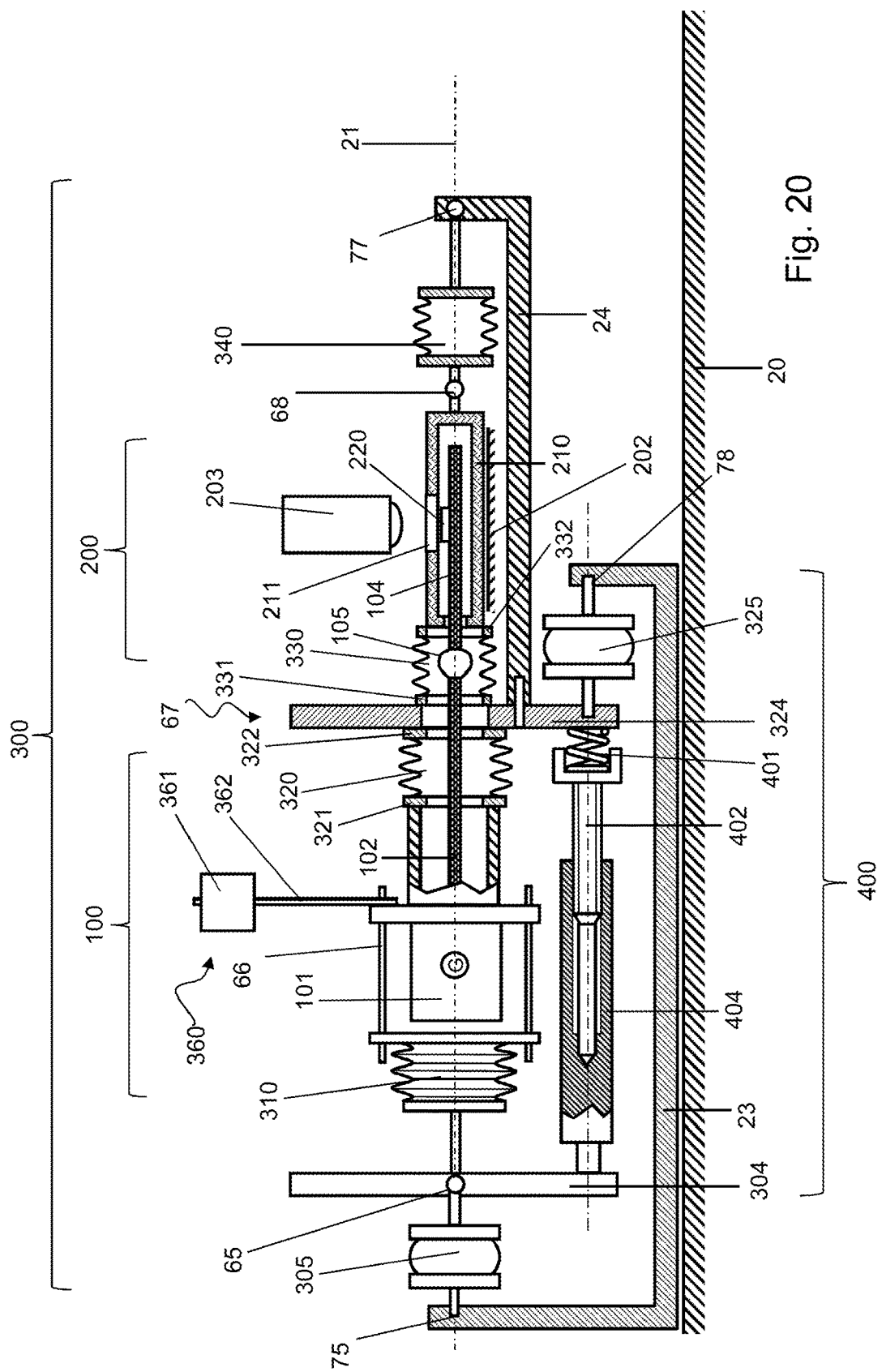
FIG. 20 a section along the longitudinal axis of a damping arrangement according to the invention for microscopy with a clamping unit bridging two compensation chambers.

Another exemplary embodiment of the invention is illustrated in FIG. 20. One end of the series arrangement of four compensation chambers 310, 320, 330, 340 is coupled to the frame 23 via the damper 305 and the frame connector 75. Another damper 325 operating diametrically to the damper 305 is disposed between the coupling connector 67 of the compensation chambers 320, 330 and the frame connector 78. In this case, although the clamping unit 400 according to the invention bridges only two compensation chambers 310 and 320, it also relieves the load from the two diametrically opposed dampers 305 and 325. The dampers 305 and 325 act here on both the cryocooler housing 101 and to the measuring cell 210. The coupling connector 67 and the connector frame 77 are bridged by an auxiliary frame 24, which enables free movement of the measuring cell 210 with respect to the connecting plate 324.

According to FIG. 20, the connecting plate 324 is disposed between the coupling locations 322 and 331. The connecting plate 324 also includes an aperture around the longitudinal axis 21 for passing through the cold head 102 inside an evacuable space.

The damping unit 300 of FIG. 20 can also be combined with additional damping measures. Based on the consideration to avoid damping elements that have opposing forces acting directly on the frame 23, according to another advantageous embodiment of the invention, the cryocooler housing 101 is coupled in addition to a dynamic vibration absorber 360 having a natural frequency that is either close to the resonance frequency of the elastic suspension the cryocooler unit 100 or close to the reversal frequency of the piston movement. Since the exemplary dynamic vibration absorber 360 which is constructed as a combination of a vibration absorber spring 362 and an absorber mass 361 is attached on one side on the cryocooler housing 101, there is no direct effect on the frame 23.

The vibration absorber spring 362 is designed so that the absorber mass 361 of the dynamic vibration absorber 360 follows the movements of cryocooler unit 100 with a certain delay. The associated dissipated energy is extracted from the vibration and hence has a damping effect.

The positive effect of the dynamic vibration absorber 360 can not only be observed close to the natural frequency of the suspension of the 100 cryocooler unit. Effects to minimize the forces acting on the frame 23 can also be observed in the region of the dominant excitation frequency of 80 Hz. The vibration forces acting, for example, on the frame 23 and/or the instrument platform 20 are attenuated relative to the excitation by approximately 40 dB, starting from about 10 times the natural frequency of the suspension.

The series arrangement of the invention of four compensation chambers 310, 320, 330, 340 in conjunction with the clamping unit 400 has the additional advantage that the measuring cell 210 is not directly connected to the frame 22 or 23, but via resilient compensation chambers 330 and 340. This effectively suppresses residual vibrations of the frame 22 or 23, since these frames 22 or 23 cannot be constructed with arbitrary rigidity and weight.

The measuring cell 210 may be connected directly to the microscope stage 202 at least for the duration of the observation of a specimen 220, if the compensation chambers 330, 340 designed to be sufficiently flexible.

The entire damping device 300 can be retracted or pivoted out of the beam path of the microscope objective 203 by releasing the clamp connection between the measuring cell 210 and the microscope stage 202. The measuring cell 210 is then freely accessible, for example, for changing the specimen 220.

In other embodiments of the invention, the individual proposed damping measures are combined.

The effect of dampers is based on a velocity-dependent and/or acceleration-dependent reaction force. In the technical implementation, all damping elements also exhibit a path dependence of the reaction force. An optimum operating point for the damping element is to be adjusted, in which a maximum of kinetic energy is converted into thermal energy while at the same time minimizing forces applied on the frame.

These relationships lead to different requirements for an arrangement for microscopic examination of inorganic and organic material specimens that are cooled by an electro-mechanical cryocooler:

The forces introduced into the frame at the attachment points of the network of spring elements and damping elements and the dynamic forces introduced into the measuring cell should be as small as possible.

The force acting on the coupling locations of damping elements should have a defined value that leads to high internal damping.

The number of the frame connector of the network should be minimal.

The static forces of paired compensation chambers should be absorbed by the network without diminishing the effect of damping elements.

According to the invention, the network of spring elements and damping elements is combined with a clamping unit that acts with a force and a counterforce on at least two different coupling connector of the network, wherein the coupling connectors connect least two spring elements and/or damping elements that are not rigidly connected to the frame.

In an advantageous embodiment of the invention, the clamping unit causes a force and a counterforce, which is independent of the vibration amplitudes.

In another advantageous embodiment of the invention, the spring elements are implemented as compensation chambers arranged in pairs.

In an advantageous embodiment of the invention, the effective axes of all spring elements and damping elements and of the vibration direction of the cryocooler lie on a common longitudinal axis. The spring elements and damping elements and the clamping unit can also be arranged in groups for design reasons. For example, they can be arranged concentrically about the longitudinal axis in order to prevent a tilting moment.

In another advantageous embodiment of the invention, the network of spring elements and damping elements for attaching the cryocooler is constructed symmetrically with diametrically opposed attachment points disposed on a common longitudinal axis on the frame.

In another advantageous embodiment of the invention, the cryocooler and the measuring unit are connected to the frame via a dedicated network of spring elements and damping elements, wherein at least the network has a clamping unit for attaching the cryocooler.

In another advantageous embodiment of the invention, at least one coupling connector of spring elements and damping elements is coupled to a dynamic vibration absorber. The connection between the absorber mass and cryocooler is hereby designed to be soft enough so that the mass of the dynamic vibration absorber follows the movements of the coupling connector with a certain delay. The associated dissipated energy is extracted from the vibration and thus produces a damping effect. The forces are not directly transferred to the frame, but only via the attachment points of the network of spring elements and damping elements on the frame.

Advantageously, the measuring cell is rigidly connected to the microscope stage at least for the duration of the measurement in order to prevent relative movement between the specimen and the beam path of the microscope.

What is claimed is:

1. An arrangement for damping vibrations in microscopic examinations of specimens performed in an evacuated measuring cell at low temperatures,
    a cryocooler unit, a microscopy unit and a damping unit in combination aligned on a common longitudinal axis, wherein the damping unit comprises a plurality of evacuable first, second, third and fourth compensation arranged in series and coupled together and combined with damper groups, with at least two damper groups of the damper groups acting diametrically, wherein the plurality of evacuable compensation chambers are arranged with an orientation along the common longitudinal axis, and wherein the plurality of compensation chambers and damper groups are connected by way of coupling connectors, and wherein the compensation chambers and the damper groups are connected by way of coupling connectors, and
    a clamping unit operatively connected to the damping unit at least at two points of the plurality of evacuable compensation chambers, and wherein a clamping force of the clamping unit acting on the coupling connectors is adjustable.

2. The arrangement of claim 1, wherein the clamping unit is operatively connected to the damping unit at clamping locations.

3. The arrangement of claim 1, wherein a clamping effect of the clamping unit on the at least two damper groups of the damper groups acting diametrically is adjustable.

4. The arrangement of claim 1, wherein the clamping unit comprises at least a biasing spring, a pressure pin and a tightening screw.

5. The arrangement of claim 1, further comprising a balancing mass connected to a coupling location of the third compensation chamber and to a coupling location of the third compensation chamber.

6. The arrangement of claims 5, further comprising a connecting plate attached to an auxiliary frame and to a biasing spring of the clamping unit and connected to the coupling location of the second compensation chamber and to the coupling location of the third compensation chamber.

7. The arrangement of claim 1, further comprising at least one dynamic vibration absorber comprising an absorber spring and a freely oscillating absorber mass and connected to the first and second compensation chambers or to the second and third compensation chambers.

8. The arrangement of claim 1, wherein walls of the plurality of evacuable compensation chambers are constructed as flexible bellows, with the bellows of the first and second compensation chamber and the bellows of the third and fourth compensation chamber having pairwise identical cross-sections and spring constants.

9. The arrangement of claim 1, wherein the plurality of evacuable compensation chambers and the measuring cell are constructed to be evacuated.

10. The arrangement of claim 1, further comprising a plurality of cold conductors conducting cold from a cold head to the specimen, wherein at least one of the cold conductors is elastically or plastically deformable, and wherein another one of the cold conductors is connected to the measuring cell.

11. The arrangement of claim 1, wherein measuring cell is connected to a microscope stage at least for an observation time of the specimen.

12. The arrangement of claim 1, wherein the measuring cell comprises a measuring cell window located in a beam path of a laser microscope.

13. The arrangement of claim 1, further comprising a frame, wherein the frame and the microscope unit are arranged on a common instrument platform and the frame is displaceable or pivotable, or both, relative to the microscope unit.

14. The arrangement of claim 1, wherein the damper groups are constructed as elastomer dampers.

15. The arrangement of claim 1, wherein the damping unit is operatively connected to the clamping unit by way of at least two coupling connectors of the plurality of evacuable compensation chambers arranged in series.

16. The arrangement of claim 1, wherein the first, second, third and fourth compensation chambers are arranged along the longitudinal axis.

17. The arrangement of claim 1, wherein the coupling connectors are connected to a frame.

18. The arrangement of claim 1, wherein the clamping unit comprises a biasing spring, causing the clamping force acting on the coupling connectors to be substantially independent of vibration amplitudes at the coupling connectors.

19. The arrangement of claims 1, wherein the cryocooler unit is attached to a first coupling connector, which connects the first and the second compensation chambers to each other, with each of the first and the second compensation chambers being connected to diametrically arranged dampers via respective second coupling connectors, and with the clamping unit acting on the second coupling connectors.

20. The arrangement of claim 19, wherein a third coupling connector of the plurality of evacuable compensation chambers arranged in series and of diametrically arranged damper is connected to a cryocooler housing and a fourth coupling connector is connected to a balancing mass.

21. The arrangement of claim 20, further comprising at least one dynamic vibration absorber which comprises a vibration absorber spring and a freely-oscillating absorber mass, wherein the third coupling connector of the plurality of evacuable compensation chambers arranged in series and diametrically arranged dampers is connected to the at least one dynamic vibration absorber.

22. The arrangement of claim 1, wherein dimensions and material of dampers of the damper groups are selected so that dynamic forces acting on the dampers during operation of the cryocooler unit cause a deformation between a minimum of 0 to 20% and a maximum of 80% -100% of a permissible deformation of the dampers, and wherein, while the cryocooler unit is switched off, a tension force is adjusted so as to cause a deformation between 30 and 70% of the permissible deformation.

\* \* \* \* \*

UNITED STATES PATENT AND TRADEMARK OFFICE
CERTIFICATE OF CORRECTION

Page 1 of 1

PATENT NO. : 10,208,742 B2
APPLICATION NO. : 14/432607
DATED : February 19, 2019
INVENTOR(S) : Dietrich Roscher It is certified that error appears in the above-identified patent and that said Letters Patent is hereby corrected as shown below:

In the Claims

Column 22,
Line 37, after "evacuable" insert -- compensation chambers comprising --;
Same line, after "compensation" insert -- chambers --.

Column 24,
Line 20, "damper" should be -- dampers --.

Signed and Sealed this
Seventh Day of May, 2019

Andrei Iancu
*Director of the United States Patent and Trademark Office*